(12) United States Patent
Hartmann et al.

(10) Patent No.: US 7,785,388 B2
(45) Date of Patent: Aug. 31, 2010

(54) METHOD FOR PRODUCING STABILIZED NITROGEN COMPOSITIONS

(76) Inventors: Richard O. Hartmann, 1827 SW. Beaverton Hwy., Suite 4, Portland, OR (US) 97201; Timothy G. Holt, 6775 Country Rd., 24, Florence, AL (US) 35634; A. Ray Shirley, Jr., 106 Fern Cove, Florence, AL (US) 35634

( * ) Notice: Subject to any disclaimer, the term of this patent is extended or adjusted under 35 U.S.C. 154(b) by 330 days.

(21) Appl. No.: 11/880,092

(22) Filed: Jul. 18, 2007

(65) Prior Publication Data
US 2008/0016765 A1 Jan. 24, 2008

Related U.S. Application Data

(63) Continuation of application No. 10/437,606, filed on May 13, 2003, now abandoned, which is a continuation-in-part of application No. 09/733,574, filed on Dec. 8, 2000, now Pat. No. 6,576,035.

(60) Provisional application No. 60/169,740, filed on Dec. 8, 1999.

(51) Int. Cl.
C05C 7/00 (2006.01)
(52) U.S. Cl. .............................. 71/55; 71/10
(58) Field of Classification Search .............. 71/10, 71/55
See application file for complete search history.

(56) References Cited

U.S. PATENT DOCUMENTS

| 4,392,881 A | 7/1983 | Kneer |
| 4,975,106 A | 12/1990 | Ferguson |
| 5,514,307 A | 5/1996 | Shirley, Jr. et al. |
| 5,591,637 A | 1/1997 | Inoue |
| 5,698,004 A | 12/1997 | Hartmann |
| 5,917,110 A | 6/1999 | Kust |
| 5,938,813 A | 8/1999 | Araya et al. |
| 5,976,212 A | 11/1999 | Hartmann |

FOREIGN PATENT DOCUMENTS

| DE | 3600704 | 7/1987 |
| DE | 3909587 | 9/1990 |
| DE | 4029955 | 3/1992 |
| JP | 58120585 | 1/1983 |

OTHER PUBLICATIONS

Andrews, "The Use of Cyanamide as the Source of Nitrogen," *The Response of Crops and Soils to Fertilizers and Manures*, Second Edition, 76-83 (1954).
Cornforth, "Calcium Cyanamide in Agriculture," *Soils and Fertilizers*, 34:463-470 (1971).
Allison, "Cyanamide, Its Uses as a Fertilizer Material," *United States Dept. of Agriculture*, 1-12 (1929).
Conforth, Soils and Fertilizers, vol. 34, pp. 463-470, 1971.
Andrews, The Response of Crop and Soils to Fertilizers and Manures, Second Edition, pp. 76-83, 1954.
Allison, United States Dept. of Agriculture, pp. 1-12, 1929.
Rynk, Robert et al. "On-Farm Composting Handbook." Natural Resource, Agriculture, and Engineering Service (NRAES) Cooperative Extension, Ithaca, NY. Jun. 1992. NRAES 54, pp. 1-23, 103-105.
Dougherty, mark. "Field Guide to On-Farm Composting." Natural Resource, Agriculture, and Engineering Service. NRAES-114, pp. 1-7 and 109.

*Primary Examiner*—C. Sayala
(74) *Attorney, Agent, or Firm*—Klarquist Sparkman, LLP

(57) ABSTRACT

Embodiments of a calcium cyanamide composition and method for their use are disclosed. The composition and method stabilize active ionic compositions comprising calcium cyanamide and enhance the effectiveness of calcium cyanamide alone or synergistically in combination with nitrogen-containing materials such as urea and organics, for example, manures. The composition and method also facilitate controllable site-directed delivery of the contents of the stabilized compositions. The composition and method are effective for fertilizing, soil amending, metal stabilizing and odor and organism inhibition. The compositions are stable, easily calibrated, and non-clogging for spray delivery to target sites.

26 Claims, 15 Drawing Sheets

| Lbs/1/2 acre inch | Percent J2 killed | Dilutions | PPM |
|---|---|---|---|
| 0 | 0% | 0 | 0 |
| 3.6 | 8% | 512 | 31.25 |
| 7 | 16% | 256 | 62.5 |
| 14 | 82% | 128 | 125 |
| 29 | 97% | 64 | 250 |
| 58 | 100% | 32 | 500 |
| 115 | 100% | 16 | 1000 |
| 231 | 100% | 8 | 2000 |

The impact of extract on J2 seems to be permanent, nematocidal, and not nematostatic
Test on larvae only

METHOD FOR PRODUCING STABILIZED NITROGEN COMPOSITIONS

CROSS REFERENCE TO RELATED APPLICATIONS

This application is a continuation of U.S. patent application Ser. No. 10/437,606, filed May 13, 2003, which is now abandoned, which was a continuation-in-part of U.S. patent application Ser. No. 09/733,574 filed Dec. 8, 2000, now U.S. Pat. No. 6,576,035 issued Jun. 10, 2003, and claims the benefit of these prior utility applications, and further claims the benefit of the earlier filing date of U.S. Provisional Application No. 60/169,740, filed Dec. 8, 1999. All of these prior applications are considered to be part of the present disclosure and are incorporated herein by reference.

FIELD

The present application concerns compositions comprising calcium cyanamide and methods for their use including, without limitation, in industry and farming, decomposition (composting), odor and organism inhibition, nutrient stabilization, fertilizing and soil amending.

BACKGROUND

Commercial calcium cyanamide (CaNCN) is actually a mixture of several components formed during or remaining after production of the desired calcium cyanamide compound. Additional components found in commercial calcium cyanamide include calcium oxide (CaO), calcium carbide ($CaC_2$), graphite carbon (C), dicyandiamide [$(HNCN)_2$] and oxides of iron, aluminum, and silicon.

Typically, for one reason or another, commercial calcium cyanamide is treated to alter the form of cyanamide or remove components remaining after manufacture. For example, because calcium cyanamide is a slow acting fertilizer that is sparingly soluble in water, it is often factory converted to water-soluble molecular cyanamide ($H_2NCN$), which is faster acting and a higher analysis source of nitrogen. In this process, calcium cyanamide is forced to dissolve in water by precipitation of calcium ions ($Ca^{2+}$) as calcium carbonate ($CaCO_3$) and by acidification to convert initially formed cyanamide ions ($NCN^{2-}$) into acid cyanamide ion ($HNCN^-$) and then into molecular cyanamide, which predominates at a pH of 4.5-5.5. Insoluble calcium carbonate and graphite carbon, which may be entrained in the calcium carbonate, are then removed by filtration. The resulting solution must be kept cool, for example, refrigerated, because it is unstable above about 70° F.

Calcium oxide and calcium carbide also are removed during the process used to provide molecular cyanamide from calcium cyanamide. Calcium oxide is converted to calcium hydroxide and further into calcium carbonate. In the case of calcium carbide, the carbide ion reacts with water to form acetylene that is lost as a gas to the atmosphere. Thus, many of the components originally in commercial calcium cyanamide are converted, removed, or lost. Since the various components of commercial calcium cyanamide also may benefit plants and soils, methods and compositions that maximize the utility of all of its various components are desirable.

A. Calcium

Calcium ions ($Ca^{2+}$) are present in most organic matter and are necessary for many enzymatic reactions, including those that facilitate energy use by living organisms. Furthermore, calcium ions aid in soil reclamation by flocculating soil and permitting water percolation. Additionally, calcium tends to enhance the breakdown of organic matter through these and other actions.

While calcium ions are abundant in nature in naturally occurring limestone (calcium carbonate, $CaCO_3$), they are not readily available for uptake because of the relative insolubility of calcium carbonate. From this is seen the need to stabilize calcium ions in soluble form to enhance the speed of calcium uptake into organic matter, both living and dead, to aid plant growth and soil reclamation.

Completely ignored to this date is calcium cyanamide's potential as a source of stabilized $Ca^{2+}$ that can rapidly enter plants and flocculate soil. While promotional literature does mention calcium cyanamide as a possible soil amendment, unstabilized it is no more useful than inexpensive mined lime ($CaCO_3$). However, if the soluble forms of calcium could be stabilized, it would provide added value to calcium cyanamide.

Stabilizing soluble calcium ions at the immediate first hydrolysis step during the production of molecular cyanamide from commercial calcium cyanamide has been overlooked. Typical descriptions of the hydrolysis of calcium cyanamide indicate conversion directly to molecular cyanamide and calcium carbonate. Furthermore, some prior hydrolysis schemes ensure complete loss of soluble calcium through $CO_2$ enrichment during aerobic hydrolysis, to provide calcium free, acid stabilized molecular cyanamide, or soluble acid cyanamide salts. Such processes leave lime ($CaCO_3$) and dicyandiamide (DiCy), formed as the initial calcium cyanamide solution is acidified through the pH range of 8-10, blackened by graphite carbon (C), in huge, now environmentally suspect piles, behind calcium cyanamide factories. Given the huge energy costs of initial calcium cyanamide production and subsequent analog production costs, it is unfortunate that a valuable nutrient such as calcium is left behind in piles of black lime for the sake of obtaining only nitrogen fertilizer from calcium cyanamide. The wastefulness of this practice is highlighted in that the major portion of commercial CaNCN is calcium. It is therefore desirable to stabilize and deliver the calcium component of calcium cyanamide for decomposition (composting) enhancement, odor and organism inhibition, plant nutrition, and soil flocculation.

B. Nitrogen

Nitrogen, in its molecular form ($N_2$) comprises approximately 78% of the earth's atmosphere. Nitrogen is a component of all proteinaceous matter found in living organisms, but only a few organisms (such as nitrogen-fixing bacteria) are able to directly capture atmospheric nitrogen and add it to the biosphere.

Proteinaceous matter, contained in dead and decaying organic matter and additionally in the excreta of animals represents a vast potential source of nitrogen for growth of living organisms. However, in proteinaceous form, nitrogen is insoluble and unavailable to living organisms except through the action of decomposers, which release nitrogen in the forms of gaseous $NH_3$ and leachable $NH_{4+}$, $NO^{2-}$, and $NO^{3-}$. These forms can be utilized by plants and allow nitrogen to reenter the living biosphere.

In many instances the rate at which nitrogen becomes available from decomposing (composting) organic matter is insufficient to provide rates of plant growth that are desired by modern agriculture. Instead, synthetic nitrogen fertilizers have been utilized, leaving huge, unused stores of environmentally suspect animal excreta. Thus, there exists a need for an environmentally sound method that increases the rate at which nitrogen becomes available to plants from decomposing organic matter.

Modern agriculture supplements plant available nitrogen by using high analysis nitrogen fertilizers, such as inexpensive urea, ammonia, ammonium compounds, and nitrates. Concurrently, use of calcium cyanamide, the first commercially available high analysis fertilizer, has declined due to the high cost of its manufacture and to the handling, shipping, and phytotoxicity problems it poses.

While modern, low-cost, fast-acting high analysis nitrogen fertilizers can provide abundant nitrogen for rapidly growing plants, their use has produced some undesirable consequences, such as leaching of nitrates into groundwater and losses of volatile ammonia to the atmosphere. These are also problems associated with composting and applying animal excreta directly to soils. Thus, it is desirable to provide compositions and methods that promote release of nitrogen from proteinaceous materials, yet slow its loss to the atmosphere and from soil. It is also desirable to provide compositions and methods that stabilize and extend the residence time of high nitrogen analysis fertilizers in the plant root zone.

C. Calcium and Nitrogen

Plants deficient in calcium but provided with an abundance of nitrogen are prone to parasitic organisms. Conversely, plants with high ratios of calcium-to-nitrogen resist parasitic organisms. It is also known that it is difficult to provide plants with calcium in direct proportion to the rate at which they can absorb soluble nitrogen forms, even if calcium and nitrogen are provided as water-soluble calcium nitrate ($CaNO_3$). Slow acting calcium sprays and expensive chelated forms of calcium have been reported not to cure calcium deficiencies observed during intensive nitrogen demanding vegetable production in California (Crop Notes, UC Extension, Salinas, Calif., July 2000). Therefore, it would be desirable to have compositions and methods that stabilize soluble calcium and promote calcium uptake by plants in proportion to nitrogen uptake, thereby conferring parasite resistance to the plants.

D. Calcium Cyanamide (CaNCN)

Calcium cyanamide which comprises 44% calcium and 24% nitrogen, was first made in the late 1800s, as part of a search for a high analysis nitrogen source for industry and agriculture to replace low analysis (1-<12%) excreta deposits. It is produced in 1000 to >3,000° C. electric arc furnaces by burning black coal and white limestone in the presence of atmospheric nitrogen. Energy costs represent the bulk of calcium cyanamide production costs.

Because calcium cyanamide is slow acting, one application at a rate of 1000 to 2000 lbs/acre lasts all growing season long. However, when calcium cyanamide is applied at these typical season long rates, particularly in cool and or dry conditions, it is necessary to delay planting until the high concentrations of plant penetrating initial hydrolysis products of calcium cyanamide, which are toxic to seeds and seedlings (phytotoxic), dissipate. Furthermore, because calcium cyanamide in its noxiously dusty irregular granule form is difficult to calibrate, its application may be haphazard so that one part of a field may be ready for planting while others exhibit persistent phytotoxicity. The phytotoxic characteristics of calcium cyanamide also make even repeated dry applications at lower rates impractical.

The observation that calcium cyanamide exhibits phytotoxicity led to its use as an herbicide. However, its use as an herbicide has largely been discontinued in favor of modern herbicides.

For the reasons above, use of dry calcium cyanamide has decreased, and presently it is no longer used in the United States. Worldwide, its use is largely restricted to rice cultivation, where hot, wet conditions quickly degrade and remove other nitrogen fertilizers, such as urea, from the soil.

Calcium cyanamide is more typically converted to faster acting and higher analysis forms of nitrogen. For example, calcium cyanamide may be aerobically hydrolyzed in the presence of carbon dioxide to provide calcium free urea (42% N). Other high analysis nitrogen forms which are produced from calcium cyanamide include calcium free, dicyandiamide ($(HNCN)_2$, 66% N) and molecular cyanamide ($H_2NCN$, 66% N). These forms have found use in both agriculture and the production of many of today's industrial polymer chemicals and medicines. However, plant beneficial calcium is not a part of these products.

It would be a benefit to provide compositions and methods that exploit the slow acting nature of calcium cyanamide yet provide immediately available plant nitrogen without phytotoxic consequences. It also would be a benefit if such compositions and methods made it easier to calibrate applications of calcium cyanamide and facilitated repeated smaller applications throughout the growing season. Furthermore it would be an advantage if these benefits were achieved at more economical rates of application and enabled more of the components that exist in commercial calcium cyanamide to be utilized.

These benefits have been partially realized by Hartmann, as described in U.S. Pat. Nos. 5,698,004 and 5,976,212, which are incorporated herein by reference. Contrary to teachings against fertilizing plants with the initial hydrolysis products of calcium cyanamide (because of their phytotoxicity), Hartmann has worked to provide easily deliverable, stable, hydrolyzed ionic CaNCN solutions, containing plant penetrating acid cyanamide anions directly to plants. Caustic is added to such ionic solutions to maintain a pH that favors the acid cyanamide ion. The calcium cyanamide solutions taught in these prior patents are sprayable if insolubles, such as calcium carbonate and residual carbon, are retained such as by a means of filtration. Balls and clumps of calcium carbonate that entrain otherwise sprayable carbon tend to plug pumping and spraying equipment. Because carbon is also beneficial to plants and soils it would be advantageous if methods existed to prevent formation of such balls and clumps, so that more calcium remained soluble, filtration was unnecessary, and the residual insoluble carbon found in commercial calcium cyanamide could be maintained in a sprayable slurry. Furthermore, it would be a benefit if it were possible to maintain a pH favorable to acid cyanamide ions without having to add caustic to overcome the tendency of these solutions to drop in pH.

E. Urea

Urea, today, is made in approximately 75 factories worldwide with a total capacity approaching 100,000,000 tons annually. Dry, water-soluble urea is a low cost, fast acting, and easily calibrated soluble nitrogen form. However, urea is recognized to undergo rapid hydrolysis, which may lead to ammonia gas release and/or losses due to nitrate leaching. Urea and excreta hydrolysis also contribute large amounts of the greenhouse gas $CO_2$. In fact, urea and decomposed proteinaceous animal excreta containing urea are now considered so environmentally threatening that farmers using such fertilizers have already been subject to fines and judgments ($30,000 to $300,000) for violation of clean water laws that regulate nitrates. It therefore would be desirable to provide compositions and methods that allow urea and animal excreta to be utilized as fertilizers without ammonia loss or rapid leaching of nitrates.

There are two basic prior approaches to simultaneously making urea-derived nitrogen available to plants for longer periods and reducing nitrate contamination. The first is to slow urea dissolution. The second is to slow the conversion of urea to nitrate by soil microorganisms, either by inhibiting the action of urease or inhibiting nitrification, or both.

Urea dissolution control may be accomplished by coating urea with hydrophobic substances, such as sulfur, to produce slow release granules. U.S. Pat. No. 4,081,264 to Ali exemplifies this technology. Ali describes encapsulated slow release fertilizers prepared by coating a fertilizer substrate (e.g. urea) with molten sulfur. Sulfur coated urea particles are brittle so they are often coated with a plasticizing substance, such as bitumen, to increase their mechanical strength. Finally, another coating of an inorganic material, such as talc, may be required to provide a free flowing material. While slow release granules can extend nitrogen availability throughout the growing season and reduce nitrate leaching, they are too costly for general agricultural use, especially in light of their lower nitrogen content.

Urease inhibitors serve to slow the conversion of urea to ammonium ions. Such inhibitors include phosphoric triamides, such as N-(n-butyl)thiophosphoric triamide (NBPT) (see for example U.S. Pat. No. 4,530,714). Phosphoric triamides however are difficult to handle and susceptible to decomposition. Efficient incorporation of phosphoric triamides into granular urea-containing fertilizers may be accomplished using liquid amide solvents, but use of such solvents in the granulation process increases fertilizer costs.

Nitrification inhibitors, when combined with urea, ammonia, and ammonium salt fertilizers, also can serve to reduce nitrate leaching. Known nitrification inhibitors include dicyandiamide (DD) and N-Halamine compounds. Dicyandiamide, which is made from calcium cyanamide, also functions as a nitrification inhibitor. It is however, short lived in hot soils.

While calcium cyanamide is believed to function as both a urease and nitrification inhibitor, direct addition of calcium cyanamide to urea is dissuaded because the residual calcium oxide in commercial calcium cyanamide promotes ammonia volatilization, especially under wet conditions (Nianzu et al., *Fertilizer Research*, 41: 19-26, 1995).

What is needed therefore are compositions and methods that make it possible to take advantage of calcium cyanamide's potential to mitigate nitrate leaching following application of urea. Furthermore it would be advantageous to provide compositions and methods that make it possible to combine commercial calcium cyanamide directly with urea, even in wet conditions, and preserve the calcium oxide component of the calcium cyanamide and/or its water dissolution products.

F. Cyanamide Dissolution and Hydrolysis Products

When calcium cyanamide first dissolves in water it produces calcium ions ($Ca^{2+}$) and cyanamide ions ($NCN^{2-}$) as products. The cyanamide ion is very basic and reacts with water to form the acid cyanamide ion ($HNCN^-$). The acid cyanamide ion is amphoteric, i.e. it can act as either an acid or a base. If the acid cyanamide ion acts as an acid it will revert to the cyanamide ion, and if it acts as a base it will react to form molecular cyanamide ($H_2NCN$). The form that cyanamide takes in solution will depend upon the pH of the solution, but molecular cyanamide is favored at pH's below 10.3, which are typical of soils. Molecular cyanamide may then undergo hydrolysis to form urea, which may further react to form ammonium ions, which may further be converted to volatile ammonia or to nitrate.

As stated previously, the acid cyanamide ion is plant and organism penetrating. Once absorbed by plants, the acid cyanamide ion lasts only 2-4 hours before it forms urea, which lasts 4-8 hours. Both acid cyanamide and urea stimulate arginine production in plants; however, cyanamide stimulates arginine production 20-times more effectively than urea. Arginine production is related to activation of both plant reproductive responses and disease and pest resistance in plants. Such activation is termed "Systemically Activated Resistance" or SAR (see for example, Kunz et. al., *Zeitschrift fur Plantzen Krankheiten und Flanzenschutz*, 61: 481-521, 1954; Lovatt et. al., *Proceedings California Plant and Soil Conference* 1992 & 1995; Wunsch et. al., *Zeitshrift fur Pflanzenphysiology*, 72: 359-366, 1974; and Von Fishbeck et. al., *Zeitschrifi fur Planzen Krankheiten*, 71: 24-34, 1964). Therefore, compositions and methods that stabilize and provide acid cyanamide ions to plants over long periods of time are desirable for producing fruitful, parasite free plants.

When CaNCN is applied at fertilizer rates, atop warm, wet soil, rapid uncontrollable aerobic hydrolysis occurs, moving initially soluble calcium to insoluble calcium forms and cyanamide ions to urea, then gaseous ammonia at that location. A need is thus seen to economically stabilize initial pre-hydrolysis soluble acid cyanamide ions and calcium ions in high dilutions so that they can rapidly percolate to target sites of choice where the ions can be absorbed by plants and aid in maintaining soil porosity.

In addition, USDA geneticists have recently succeeded in placing the Cah gene from natural soil cyanobacteria into crop plants cells to make them resistant to the phytotoxicity of acid cyanamide (HNCN) ions. This gene permits a plant to rapidly convert acid cyanamide ions to non-phytotoxic urea. Using CaNCN fertilizer as a dual-use foliar herbicide and nitrogen source is envisioned as an attractive alternative to single-use herbicides (USDA Agricultural Research/July 1998). Thus, should crop plants with the Cah gene obtain regulatory approval, a need for target site delivery of a stabilized source of acid cyanamide ions will arise.

Another product of calcium cyanamide dissolution and hydrolysis is dicyandiamide. Dicyandiamide is formed by polymerization of cyanamide in the presence of ammonia, alkaline earth hydroxides (e.g. $Ca(OH)_2$), or other bases, and particularly at a pH between 8 and 10.

G. Calcium Carbide

Calcium carbide ($CaC_2$), the initial product of arc furnace burning (>3,000 C) of ccal and lime, remains a residual in commercial calcium cyanamide. Hydrolyzing calcium carbide produces water-soluble acetylene gas ($C_2H_2$), which is about 50% as soluble in water as $CO_2$ but less dense. Due to Department of Transportation regulations, the calcium carbide content of calcium cyanamide must be reduced below 0.1% before it can be shipped. Regardless, enough residual carbide exists in commercial calcium cyanamide to produce a noticeable carbide gas odor upon opening a sealed vessel of water in which calcium cyanamide has been mixed.

Acetylene itself has been implicated as a nitrification inhibitor ("Improving the Efficiency and Predictability of Biological Inhibitors to Reduce Nitrogen Losses and Enhance Flooded Rice Productivity," Termination Report for ACIAR Special Purpose Grant, by International Fertilizer Development Center, November 1997). However, encapsulated calcium carbide (ECC), was shown to significantly affect yield over urea only when applied with urease inhibitors; otherwise, yields with urea plus ECC were similar to urea.

Because the residual calcium carbide content of calcium cyanamide is typically factory reduced for shipping by sprinkling it with water in the presence of atmospheric carbon dioxide, the soluble calcium content of commercial calcium cyanamide is effectively reduced by production of calcium carbonate. Therefore, compositions and methods that eliminate the need to remove calcium carbide prior to shipment would be desirable. Furthermore, methods and compositions that take advantage of the calcium carbide component of calcium cyanamide to provide nitrification inhibition, and/or provide an alternative to current methods of stabilizing calcium carbide for application to soils, are desirable.

H. Calcium Oxide

Calcium oxide, a by-product of calcium cyanamide production, is considered a nuisance for at least two reasons. First, calcium oxide readily absorbs carbon dioxide from the atmosphere to form calcium carbonate. Calcium carbonate, has a density that is lower than calcium oxide and therefore occupies more space than the calcium oxide from which it forms. When calcium oxide reacts to form calcium carbonate within particles of commercial calcium cyanamide, the result is an expansion that leads to cracking and noxious dusting of the calcium cyanamide product. Second, calcium oxide reacts with water to form calcium hydroxide, a strong base. During production of molecular cyanamide from calcium cyanamide, the calcium oxide component of the commercial calcium cyanamide product makes it necessary to add additional acid to lower the pH to 4.5-5.5, thus adding expense to the molecular cyanamide product.

As discussed previously, calcium oxide also is a potential source of calcium ions from commercial calcium cyanamide. Therefore, it is desirable to preserve the soluble calcium that is contained in the calcium oxide. Furthermore, as also discussed above, it is advantageous to prevent production of insoluble calcium carbonate from calcium oxide if spray application of calcium cyanamide is desired.

I. Organics

In recent years odorous "greenhouse gas" emissions, coliform bacteria, leachable nitrogen, and phosphate from concentrated animal feeding operations has become an environmental concern, both in the US and the throughout the world. Such concerns have prompted world-wide funding of livestock operations inspections for compliance with herd size and odor, disease and water nutrient level mitigation measures. For example, in the Netherlands, animal operations must account for and balance every single unit of input with output units. Aerobic composting that wastefully releases nitrogen and carbon into the atmosphere, and storage of animal wastes in vast aerobic, odorous lagoons still remain the principal available mitigation measures short of reducing herd size and suffering negative economic consequences.

Thus there appears a vast urgent need to provide an economical, practical and rapid, non-gas releasing, composting alternative to animal feeding sites. Such an alternative method of composting would desirably reduce the odor and disease causing organisms associated with animal wastes while resulting in a fertilizer composition that contains stabilized nutrients which promote sustained growth and parasite resistance in plants and serve as effective soil amendments.

J. Metals

Metals are an essential to life. However, metals are increasingly being leached below plant root zones due to the increased use of soluble, acid forming nitrogen plant foods. One solution to this problem is to apply lime to soils because many metals are less likely to leach from soils of higher pH. Lime, albeit inexpensive, requires tons per acre and considerable application expenses to achieve modest increases in soil pH. As explained earlier, lime is virtually insoluble, thus slow to release soluble calcium and pH increasing carbonate ions. Thus, lime only slowly raises soil pH, especially at depth in the soil where it is desired to immobilize metals near plant roots so that they are available to the plants. What are needed are compositions and methods that can supply metal micro-nutrients quickly to plant root zones and stabilize them in the root zone by raising the pH of the soil at depth. Because commercial calcium cyanamide contains approximately 2% oxides of the elements iron, silicon, and aluminum, it would also be advantageous to make use of calcium cyanamide as a source of these micro-nutrients while simultaneously providing for their stabilization in the soil.

Carbon dioxide and catalytic converter metal deposits from auto exhausts are apparently resulting in metal leaching into groundwater along roadsides. Acidic conditions develop along roadsides through carbon dioxide dissolution in rain water and decomposition of plant matter. These conditions foster leaching of deposited metals, some of which are toxic. For example, although lead is no longer a component of most gasoline products, lead contamination remains a problem where high concentrations of the metal were deposited in the past. Thus, there is a need to slow or prevent leaching of metals from soils along roadsides. Again, application of lime is one possible solution, but what are needed are compositions and methods that can provide metal stabilization in soils without the limitations of lime discussed previously.

SUMMARY

The compositions and methods of the present invention satisfy the background needs and offer the desired advantages identified above. Generally, the disclosed compositions and methods provide for stabilization, controllable release, and enhanced efficiency of the components of commercial calcium cyanamide, alone or in combination. For example, when calcium cyanamide is combined according to the disclosure with nitrogen-containing materials, co-activation and stabilization occurs, providing synergistic responses from the components of both the calcium cyanamide and of the nitrogen-containing materials.

In one aspect, the compositions and methods of the disclosure may be understood in analogy to the art of canning or freeze-drying, in which food is peeled, cut and slightly cooked, imbibed with liquids, then mechanically sealed or freeze dried so that the initially exposed and softened elements are stabilized and preserved. In much the same way, the compositions and methods of the present disclosure may be thought of as initially exposing and then preserving the beneficial initial dissolution and hydrolysis products of the components of commercial calcium cyanamide. Thus, an overall objective is to free, stabilize in soluble or suspendable form, activate, and preserve all the components initially available from commercial calcium cyanamide so that they may be controllably released together to provide full, new effects at a later time.

In some embodiments, the disclosure provides granular materials that meet the objectives of freeing, stabilizing, activating and preserving the components of commercial calcium cyanamide. Such granular materials generally comprise about 0.1 to about 40% of the total weight as calcium cyanamide and about 60 to about 99.9 percent of the total weight as urea. In particular embodiments, the material comprises calcium cyanamide homogeneously mixed with the urea. In other particular embodiments, the granular material is heterogeneous and comprises a core and a shell.

The core of the heterogenous granular material may comprise a substance selected from the group consisting of calcium cyanamide, urea, calcium oxide, calcium carbide, dicyandiamide and mixtures thereof, and the shell may comprises a substance selected from the group consisting of calcium cyanamide, urea, calcium oxide, calcium carbide, dicyandiamide and mixtures thereof. In a more particular embodiment, the core comprises calcium cyanamide and the shell comprises urea. In other particular embodiments, components of commercial calcium cyanamide, such as calcium oxide, dicyandiamide and mixtures thereof, are used as a core material and coated with a shell of calcium cyanamide, urea, calcium oxide, dicyandiamide, nitrogen and non-nitrogen fertilizers, and combinations thereof. For example, a core of dicyandiamide may be coated with a shell (or shells) of urea, calcium oxide, calcium cyanamide and combinations thereof.

In some embodiments, the granular materials further comprise at least one additional nitrogen-containing material, for example natural organics, such as manure, ammonium salts, such as ammonium sulfate, ammonium chloride, ammonium monophosphate, ammonium diphosphate, ammonium citrate, ammonium nitrate, calcium ammonium phosphate, and mixtures thereof. In other embodiments, the granular materials further comprise at least one non-nitrogen plant nutrient, for example, a non-nitrogen plant nutrient selected from the group consisting of phosphorous, potassium, iron, copper, zinc, manganese, boron, magnesium, molybdenum, sulfur, and mixtures thereof. In yet other embodiments the granular material comprises at least one nitrogen-containing compound and at least one non-nitrogen plant nutrient which may, for example, be selected from the nitrogen-containing compounds and non-nitrogen plant nutrients that are specifically listed above. Such nitrogen-containing compounds and non-nitrogen plant nutrients may be combined with urea, calcium cyanamide, or both.

In some embodiments, heterogeneous compositions comprising a calcium cyanamide core and a urea shell, that exhibit particularly effective dissolution, activation, and stabilization of calcium cyanamide components, are provided. In particular embodiments, the calcium cyanamide core is from about 0.1 to about 40 percent by weight and the urea shell is from about 60 to about 99.9 percent by weight. In a more particular embodiment, the calcium cyanamide core comprises from about 0.1 to about 10 percent of the total mass of the composition and the urea shell comprises from about 90 to about 99.9 percent of the total mass of the composition. In other embodiments, heterogeneous compositions comprising a core and a urea shell are provided where the core comprises one or more of the typical components of commercial calcium cyanamide. For example, a heterogeneous material comprising a calcium oxide, calcium carbide and/or dicyandiamde core and a urea shell is provided. Such alternative heterogeneous compositions may comprise from about 0.1 to about 40 percent by weight core material and from about 60 to 99.9 percent by weight urea shell, such as from about 0.5 to 10 percent by weight of the core material and from about 90 to 99.5 percent by weight urea shell, or even more particularly from about 1 to 5 percent by weight core material and from about 95 to 99 percent by weight urea shell.

Heterogeneous core-shell materials may exhibit an apparent react zone at the interface between the core and the shell that may be indicative of co-mingling of the initially reacted core material and the urea shell during preparation of the material. It is postulated that the react zone extends from inside the core out into the observable halo in the urea shell. The react zone may be responsible for the rapid and enhanced reactivity of these compositions.

Heterogenous materials comprising commercial calcium cyanamide or one or more components of commercial calcium cyanamide and urea may be granular, and may further comprise at least one additional nitrogen-containing compound and/or at least one non-nitrogen plant nutrient. In particular embodiments, the materials may further comprise a hardening agent, such as formaldehyde, in, for example, the urea shell.

The disclosure provides embodiments of a method for making a heterogeneous granular composition by providing a particle (e.g., a calcium cyanamide particle, a calcium oxide particle, dicyandiamide particle, a calcium carbide particle or any other particle comprising the individual components of commercial calcium cyanamide) and coating the particle with a shell material, most typically urea. In particular embodiments, the calcium cyanamide particle is from about 0.1 to 40 percent by weight of the final heterogeneous granular composition, for example, about 0.1 to about 10 percent by weight of the final heterogeneous granular composition. In other embodiments, the calcium cyanamide particle is coated with molten urea, which may be sprayed onto the calcium cyanamide particle to form the heterogeneous granular composition. In more particular embodiments, the molten urea further comprises from about 0.001% to about 20% water. Water may assist in initial activation of the components of the calcium cyanamide particle and stimulate formation of a react zone at the interface between the calcium cyanamide core and the urea shell.

In some embodiments, a calcium cyanamide particle is coated with successive layers to form a heterogeneous granular composition. In particular embodiments the successive layers are all urea layers. However in other particular embodiments, at least one of the successive layers comprise materials selected from the group consisting of urea, ammonium sulfate, ammonium citrate, ammonium phosphate, calcium ammonium nitrate, calcium nitrate, sodium nitrate, ammonium chloride, and mixtures thereof.

Methods for making homogeneous solid compositions comprising calcium cyanamide are also disclosed. In one embodiment, a homogeneous solid composition is made by combining calcium cyanamide, a nitrogen-containing material, and water, where the amount of water is at least 14 times the weight of the dry calcium cyanamide, to form an aqueous material. Aeration of the aqueous material is inhibited and the aqueous material is dehydrated to form a solid. The nitrogen-containing material may be selected from the group consisting of urea, manure, and combinations thereof. In other embodiments, the nitrogen-containing material is urea and the aqueous material is saturated with urea. The aqueous material may be a slurry, and it also is possible to include at least one additional nitrogen-containing compound and/or at least one additional non-nitrogen plant nutrient to the aqueous material. A hardening agent may be further included in the aqueous material.

Surprisingly, when aeration is inhibited, calcium cyanamide and urea may be directly added to one-another according to these methods, without significant loss of nitrogen, to yield a highly active composition. The composition may be preserved by dehydration and may be reactivated at a desired time and place by adding water. Also surprisingly, if the nitrogen-containing material is manure, adding calcium cyanamide and inhibiting aeration serves to promote rapid (for example, a few hours to few days) release of soluble nitrogen and other nutrients from organic matter.

As will be discussed subsequently, what is even more surprising is that rapid composting of manures, and also odor and microorganism inhibition, are observed even at very low calcium cyanamide percentages (e.g. less than about 1 weight percent). For example, when aeration is inhibited, liquidized manure with only 0.2 percent of the manure weight in solid calcium cyanamide exhibits these characteristics.

Thus, the methods of the disclosure rely in part on the discovery that inhibiting aeration of aqueous solutions of calcium cyanamide helps preserve the initial dissolution and hydrolysis products of calcium cyanamide. Aeration of aqueous solutions of calcium cyanamide appears to lead to increased precipitation of soluble calcium ions as insoluble calcium carbonate and to a reduction in pH that favors molecular cyanamide over acid cyanamide ions. Inhibiting aeration counteracts this effect. Any method of inhibiting aeration or combinations thereof may be used and specific, non-limiting examples include the following.

Aeration may be inhibited by simple techniques that provide relatively shorter periods of preservation of the desirable dissolution and hydrolysis products. For example, degassed water (e.g., boiled water, water subject to a vacuum, or nitrogen purged water) may be used instead of water containing dissolved atmospheric gases. Minimizing the vigor of mixing to slow dissolution of atmospheric gases into the water is another simple measure that may provide temporary stabilization of the liberated components of calcium cyanamide.

Other methods of inhibiting aeration that may provide for more controllable and longer preservation include the use of closed containers to inhibit exchange of gases with the atmosphere. A narrow opening or a loose fitting closure for such containers will provide some limited inhibition of aeration. Tight fitting or sealed closures (e.g., with a gasket or o-ring) are more desirable because gas exchange with the atmosphere is substantially prevented. When aqueous calcium cyanamide compositions are prepared and stored in sealed containers, they may be stored almost indefinitely.

Evacuation of the gases overlying an aqueous calcium cyanamide composition is another method of inhibiting aeration. Conversely, a gas that serves to substantially exclude the atmosphere may be added to a container. A gas may be added even if there is no closure on the container, provided the gas forms a dense blanket (e.g. argon) or is added to provide for constant gas outflow through the opening of the container. If the container is sealed, a pressurized gas may further serve to expel the contents of the container and deliver the highly active aqueous compositions of this disclosure.

In particular embodiments the gas may be selected from the group consisting of nitrogen, acetylene, ammonia, argon, and mixtures thereof. In more particular embodiments, the gas is acetylene and the acetylene is generated from residual calcium carbide in the calcium cyanamide. Thus, surprisingly, when calcium cyanamide compositions are mixed with water (in at least 14× excess by weight relative to the calcium cyanamide content), in a container that is quickly sealed, a self-stabilizing highly active composition is obtained without any additional effort or additives. Furthermore, buffered by the calcium carbide gas the resulting composition may be sprayed as it contains only finely divided carbon, rather than calcium carbonate balls and clumps. For example, the composition may be sprayed, either directly or by injection into a chemigation/fertigation apparatus, without clogging.

Homogeneous granular materials according to the disclosure also are provided by a method of melting together a mixture of urea and calcium cyanamide, and then prilling, granulating, or spraying the melted mixture onto a seed particle to form a granule. In some embodiments, the seed particle is a particle of urea and in others, the seed particle is a particle of calcium cyanamide. The mixture of urea and calcium cyanamide and/or the seed particle may further comprise at least one additional ingredient, selected from the group consisting of nitrogen-containing materials, non-nitrogen plant nutrients, and mixtures thereof.

The disclosure also includes aqueous compositions comprising greater than about 40 parts of water and about 10 parts of calcium cyanamide and urea combined, where the about 10 parts of calcium cyanamide and urea combined further comprises from about 0.1 to about 3 parts calcium cyanamide and from about 7 to about 9.9 parts urea. Desirably, aeration of such compositions is inhibited. Inhibition of aeration may be accomplished, for example, by preparing and keeping the composition in a closed container. In some embodiments, a gas is added to the container to inhibit aeration. It also is possible to inhibit aeration by any of the means discussed previously or subsequently. Such aqueous compositions may be either slurries or solutions.

Another discovery described by the disclosure is that preservation of the initial dissolution and hydrolysis products of calcium cyanamide can be realized by combining small amounts of calcium cyanamide with animal excreta to provide stable, odor and microorganism inhibited compositions. Compositions are disclosed comprising from about 0.01 to about 5.0 percent calcium cyanamide and from about 95 to about 99.99 percent animal excreta, where the animal excreta further comprises water in an amount at least 14× the weight of the calcium cyanamide. In particular embodiments, such compositions may comprise from about 0.01 to about 1.0 percent calcium cyanamide and from about 99 to about 99.99 percent animal excreta, and still exhibit surprising properties. In other particular embodiments, the animal excreta is an aqueous slurry of manure.

One of the unexpected properties observed for aqueous calcium cyanamide/nitrogen-containing material compositions, for example, aqueous calcium cyanamide/manure compositions, is that they quickly penetrate and flocculate soils. It is believed that soluble calcium ions and soluble nitrogen forms, such as urea, synergistically stabilize and facilitate transport of high pH (e.g., a pH greater than about 8) aqueous calcium cyanamide compositions deep into soils. Inhibition of aeration until such compositions are applied is desirable to effect full delivery of the initial dissolution and hydrolysis products of calcium cyanamide to the soil or growth medium.

The disclosure also provides embodiments of a method of delivering nutrients to plants. In one embodiment, a calcium compound selected from the group consisting of calcium cyanamide, calcium oxide, calcium carbide, and mixtures thereof is added to water to form an aqueous composition and aeration is inhibited until the composition is applied foliarly or to soil (medium) to provide nutrients to plants. In a particular embodiment, the calcium cyanamide is commercial calcium cyanamide and it is added to at least 14× its weight in water. The aqueous composition may be utilized as a sprayable slurry or optionally, solids may be removed from the aqueous composition before it is applied. Solids may be removed, for example, from the aqueous composition by a method selected from the group consisting of filtration, centrifugation, and decantation.

If urea or animal excreta are added to aeration-inhibited aqueous compositions comprising a calcium-containing compound, the synergistic soil amending action of soluble calcium and urea may provide improved delivery of all the nutrients in the composition. In various embodiments, urea may be added in an amount from about 0.01 percent by weight of the composition to about its saturation limit in the aqueous composition. Additional urea may be added if a slurry containing urea particles is desired.

In another alternative embodiment, aeration of aqueous calcium-compound-containing compositions is inhibited until the compositions are added to additional water and applied to plants, soils, or mediums through an irrigation system, for example a fertigation/nitrigation system.

Also disclosed are embodiments of a method for enhancing plant growth by applying granular composition according to the disclosure directly to soil to induce plant growth. In one embodiment, a composition comprising a calcium cyanamide core and a urea shell, where the calcium cyanamide core is from about 0.1 to about 40 percent by weight and the urea shell is from about 60 to about 99.9 percent by weight, is applied to soil to induce plant growth.

Methods of enhancing plant growth by dissolution of the granular compositions of the disclosure in water also are included. For example, in one embodiment, a granular composition comprising a calcium cyanamide core and a urea shell, where the calcium cyanamide core is from about 0.1 to about 40 percent by weight and the urea shell is from about 60 to about 99.9 percent by weight, is added to water to form an aqueous composition that is applied (to soil or foliarly) to enhance plant growth. In more particular embodiments, aeration of the aqueous composition is inhibited until the aqueous composition is applied to enhance plant growth.

As previously mentioned, methods of composting animal excreta also are disclosed. In one embodiment, about 0.1 to about 1.0 percent by weight calcium cyanamide is added to animal excreta, where the animal excreta contains water in an amount at least 14× the mass of calcium cyanamide added to form a mixture. In a particular embodiment, the animal excreta is liquidized manure.

Another disclosed method of composting animal excreta comprises adding about 0.1 to about 1.0 percent by weight calcium cyanamide to animal excreta, where the animal excreta contains water in an amount at least 14× the mass of calcium cyanamide to form a mixture. Aeration of the mixture is inhibited, for example, by placing the mixture in a closed or sealed container. It also is possible to inhibit aeration by forming the mixture in a container, where the container also holds a gas, selected from the group consisting of nitrogen, argon, ammonia, acetylene, and mixtures thereof, that serves to inhibit gas exchange between the container and the atmosphere.

The calcium cyanamide that is added to the animal excreta according to these embodiments may be calcium cyanamide in a form selected from the group consisting of calcium cyanamide fines, granulated calcium cyanamide, a homogeneous granule comprising calcium cyanamide and urea, a heterogeneous granule comprising calcium cyanamide and urea, an aqueous composition comprising calcium cyanamide dissolved in greater than 14× its weight in water, and mixtures thereof. Furthermore, individual components of commercial calcium cyanamide such as calcium oxide, calcium carbide, and dicyandiamide, also may be used alone or in addition to any form of calcium cyanamide. Animal excreta composted according to the embodiments of the disclosure may be conveniently applied to soil using a slurry spraying apparatus.

Another disclosed embodiment of enhancing plant growth comprises combining greater than about 40 parts of water with about 10 parts of a combination of calcium cyanamide and urea, where the about 10 parts of a combination of calcium cyanamide and urea further comprises from about 0.1 to about 3 parts calcium cyanamide and from about 7 to about 9.9 parts urea to form a first aqueous composition. Aeration of the first aqueous composition is inhibited and the first aqueous composition is diluted in additional water to form a second aqueous composition. The second aqueous composition is then applied to enhance plant growth.

The foregoing and other objects, features, and advantages of the invention will become more apparent from the following detailed description of several embodiments which proceeds with reference to the accompanying figures. The inclusion of particular embodiments in this Summary, does not imply that they are essential to the invention nor the sole embodiments within the disclosure.

DETAILED DESCRIPTION

Figure 1:
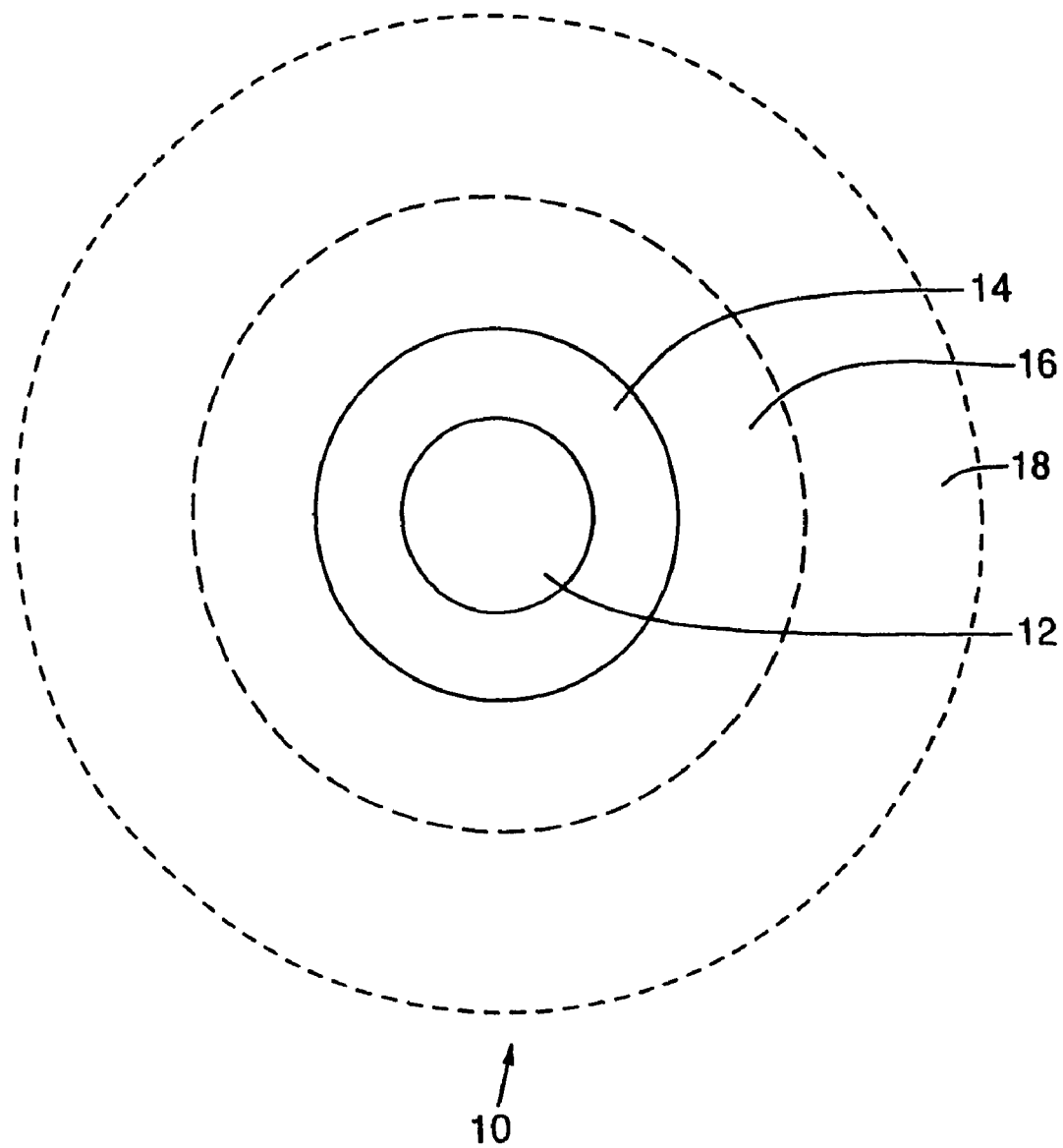
FIG. 1 is a schematic of one embodiment of a calcium cyanamide granule according to the present invention.

The disclosed embodiments of the method and composition are related to the discovery that the components normally present in commercial calcium cyanamide and/or formed upon water dissolution and hydrolysis of commercial calcium cyanamide (e.g. dicyandiamide), may be exploited to provide fertilizing and soil amending materials that are controllably stabilized and exhibit enhanced efficiency at surprisingly low rates of application. The components of dry commercial calcium cyanamide include, but are not limited to, calcium cyanamide, calcium oxide, dicyandiamide calcium carbide, carbon and the oxides of iron, silicon, and aluminum. When calcium cyanamide is combined, according to the disclosure, with nitrogen-containing materials, co-activation and stabilization occurs, providing synergistic responses from all the components in calcium cyanamide and all those in the nitrogen-containing materials.

As used herein, the term calcium cyanamide is synonymous with the term commercial calcium cyanamide, its components and its hydrolysis/dissolution products, unless it is clear from the context that the compound calcium cyanamide itself is intended. However, it should be recognized that the terms calcium cyanamide and commercial calcium cyanamide encompass calcium cyanamide materials where additional components of commercial calcium cyanamide such as carbon, calcium oxide, dicyandiamide and calcium carbide are absent or are present in amounts different from typical commercial calcium cyanamide. These terms also encompass calcium cyanamide materials that have additional nitrogen-containing compounds and/or non-nitrogen plant nutrients. Furthermore, it should be understood that certain embodiments of the composition and method of the disclosure may be utilized to activate and stabilize the products of water dissolution of the individual components typically found in commercial calcium cyanamide, including, for example, dicyandiamide.

As will be made clear in the following examples, each component of commercial cyanamide may be utilized for a particular effect. By altering the relative amounts of the components in commercial calcium cyanamide, it is possible to enhance or reduce certain effects. For example, increasing the amount of calcium oxide in commercial calcium cyanamide will raise the pH of aqueous compositions prepared from it.

In one aspect, the disclosed methods and compositions make it possible to utilize all the components found in commercial calcium cyanamide for beneficial purposes, rather than converting, removing, or losing them. For example, the methods and compositions stabilize calcium derived from calcium cyanamide, calcium oxide and calcium carbide in a form that is surprisingly available for immediate uptake by plants, useful as a soil amendment, and effective as an aid in decomposition of organic matter (composting). According to the disclosure, calcium oxide in commercial calcium cyanamide is not an undesirable by-product; rather, its presence in commercial calcium cyanamide is exploited to raise pH and stabilize bioactive acid cyanamide ions that form as calcium cyanamide dissolves. Furthermore, the calcium oxide also may promote formation of dicyandiamide by dimerization of cyanamide ions, a process which occurs in the presence of alkaline earth hydroxides, such as the calcium hydroxide formed from calcium oxide, especially if the pH is in the range of about 8 to about 10. The methods and compositions also make it possible to use commercial calcium cyanamide as a source of easily applied carbon and as a source of trace metals, such as iron, silicon, and aluminum. Calcium carbide may be utilized according to the disclosure both for its calcium ion content and the acetylene gas that it provides upon hydrolysis. Thus, the disclosed embodiments of the method and composition provide added value to commercial calcium cyanamide.

The disclosed compositions and methods provide for stabilization and enhanced persistence and efficiency of nitrogen fertilizers such as urea and animal excreta. Nitrogen fertilizers combined with calcium cyanamide according to the disclosure, appear to assist dissolution of calcium cyanamide and further preserve its initial hydrolysis products, especially when aeration is inhibited. Synergistically, the initial hydrolysis products of calcium cyanamide appear to facilitate transport of nitrogen fertilizers to plant root zones and extend their residence time in the soil. In the case of animal excreta, odor and disease-causing microorganisms are inhibited as well. Thus, urea and animal excreta become value-added fertilizers when combined with calcium cyanamide according to the disclosure.

In another aspect, the compositions and methods also maximize utilization of the components of commercial calcium cyanamide by providing for stabilization, controllable release, and enhanced efficiency of all the components of commercial calcium cyanamide. Furthermore, the composition and method facilitate rapid activation, from otherwise slow-to-dissolve calcium cyanamide, of the bioactive and chemically active components that dissolve and react to form soluble ions.

Accordingly, one overall objective is to free, then stabilize calcium cyanamide's components in ionic and soluble form so that they may be used together simultaneously. The disclosed composition and method make it possible to rapidly and fully activate all the components initially available from difficult to wet and slow to fully water activate (much like cocoa in milk), commercial calcium cyanamide. Not only are the components activated, they may be instantly and indefinitely stabilized in a highly active ionic tea for novel beneficial responses, rather than being volatilized to air, allowed to further convert to secondary less chemically and bioactive soluble forms, or allowed to precipitate from solution.

For example, disclosed are embodiments of a method of activating and sealing to stabilize soluble calcium ions initially freed from calcium cyanamide, calcium carbide and calcium oxide. Active, soluble calcium ions present in or generated by the disclosed composition and method provide for rapid soil amendment and decomposition of (composting of) organic matter. The composition and method further function to stabilize the initial high pH state that results as calcium cyanamide dissolves and reacts with water. The preserved high pH stabilizes the chemically and bioactive acid cyanamide ion. Furthermore, the resultant preserved high pH state obtained from the composition and by the method of the disclosure stabilizes, in less mobile form, otherwise leachable micronutrients such as iron, silicon and aluminum that are present in commercial calcium cyanamide. An added benefit is that beneficial and/or toxic metals already present in soils, or added thereto, may be stabilized because the high pH state is effectively transferred to the soil at depth (e.g., several inches to several feet) by the composition and method. Also, according to the disclosed method and composition, soil and plant valuable fine carbon from commercial calcium cyanamide is stabilized and prevented from precipitating with insoluble calcium carbonate.

The stabilized liquid state according to discoveries in this disclosure may be achieved by inhibiting aeration of the water mixed components. Surprisingly, it has been discovered that dissolution of calcium cyanamide in water provides a self-stabilizing, highly active composition of ions. Self-stabilization is believed to be due in part to the calcium carbide component of commercial calcium cyanamide. Acetylene, generated when calcium carbide is exposed to water, is water-soluble and lighter than air and may serve to purge or displace carbon dioxide from aqueous compositions. If trapped in a closed or sealed container, the acetylene serves as a buffer gas and inhibits gas exchange between the aqueous compositions and the atmosphere.

Aeration of aqueous calcium cyanamide compositions may be further inhibited by mixing calcium cyanamide with water that is partially or completely saturated with solubles that act to buffer out $CO_2$. For example, urea and soluble species generated by composting manures with small amounts (e.g., 0.01 to 5% by weight) of calcium cyanamide according the disclosure appear to exclude atmospheric carbon dioxide from aqueous compositions. Furthermore, the inhibition of aeration by urea and other solubles appears to be maintained even as the liquid compositions percolate into soils.

Inhibition of aeration also is believed to partly explain the unexpected properties exhibited by the solid compositions of the disclosure. It appears, for example, that when molten urea is combined with calcium cyanamide, acetylene gas is formed as residual water in the urea decomposes calcium carbide. The acetylene gas seems to create conditions within the solid compositions that inhibit aeration. In the case of heterogeneous compositions that comprise a calcium cyanamide core and a urea coating, it is plausible that acetylene generated during manufacture purges atmospheric gases including carbon dioxide from the near the core. As urea cools and solidifies around the core it is sealed from further exposure to atmospheric gases.

An unexpected benefit of combining an excess of molten urea with calcium cyanamide is that partial dissolution and hydrolysis of calcium cyanamide components appear to occur. Again, the moisture content of molten urea is believed to be responsible. Partial dissolution transforms otherwise hard to dissolve, non-uniform, noxiously dusty co-melted fines or core granules of dry calcium cyanamide into rapidly activated and stable sources of the initial dissolution and hydrolysis products of calcium cyanamide. Activation of calcium cyanamide during production of the solid compositions of the disclosure is evidenced by the presence in some embodiments of a microscopically visible homogeneous react zone at the interface between calcium cyanamide and urea. Visible co-mingling between urea and calcium cyanamide phases suggests that some type of reaction is occurring. Novel activation and preservation of calcium cyanamide by an excess of molten urea is also suggested by the dramatically increased cyanamide yields observed for the heterogeneous solid composition of the disclosure. Furthermore such heterogeneous compositions dissolve in water much more quickly than uncoated calcium cyanamide particles and the resulting solutions exhibit surprisingly active behavior.

In addition to capturing acetylene, generated in situ during dissolution of calcium cyanamide, within a container during and after liquid mixing, it is possible to add other gases, for example inert gases, to a container to inhibit aeration. When using an external gas source, it also is possible to maintain the preserved, aeration inhibited state even during sealed vessel draining by using added gas pressure to expel the contents of the vessel. This facilitates direct delivery of highly active aqueous calcium cyanamide compositions to target sites, even without filtering, as delivery apparatuses are not plugged by the finely divided carbon slurries that are preserved by inhibiting aeration of aqueous calcium cyanamide compositions. Furthermore such aqueous compositions may be readily diluted and delivered with full effect by injection into high volumes of water such as non-aerated sprays or irrigation waters, that also appear to buffer and preserve the beneficial soluble components of calcium cyanamide.

In another aspect, the disclosure provides embodiments of a method and composition that reduce the haphazardness of prior applications of calcium cyanamide. In some embodiments, variable soil temperature and moisture conditions that lead to unpredictable results for dry application of calcium cyanamide are overcome by first forming stabilized aqueous compositions that are readily calibrated and uniformly applied. In other embodiments, granular compositions of the disclosure overcome the haphazardness of prior applications of dry calcium cyanamide because they are easily calibrated and more uniformly applied.

In yet another aspect of the disclosure, embodiments of a composition and method that rapidly and fully activate calcium cyanamide are provided. For example, both molten urea and liquidized manures appear to aid in rapidly dissolving and activating the available chemically and bioactive calcium and cyanamide N ions from calcium cyanamide. Conversely and surprisingly, combining very low amounts (e.g., from about 0.01 to about 5% by weight) of calcium cyanamide with liquidized manures not only activates the calcium cyanamide but leads to rapid (hours) and full (1800% increase) activation of soluble nitrogen from insoluble manure proteins. Furthermore is has been discovered that even below about 0.2% by weight, calcium cyanamide will effectively raise manure pH, rapidly reduce pungent manure odors and simultaneously inhibit nitrate-forming and disease-causing organisms (for example, 99.999% reductions in coliform bacteria have been observed within 24-120 hrs).

A further aspect of the disclosure relates to the discovery that aqueous compositions of urea (provided directly or provided indirectly from decomposed animal excreta) are effective in persistently amending soil to aid deep (e.g., several inches to several feet) percolation of liquids into soils. The effect is even more pronounced, when urea and/or decomposed animal excreta are combined with calcium cyanamide. In one embodiment, soil amending may be accomplished using a pre-drench of soils with an aqueous urea composition, followed by application of other aqueous materials for which percolation into the soil is desired. In a particular embodiment, drenching soil with stabilized (e.g., by inhibiting aeration) highly active liquid calcium cyanamide/urea compositions, facilitates simultaneous soil amendment and rapid delivery of the initial dissolution and hydrolysis products of commercial cyanamide deep into soils. Thus, high-pH-stabilized calcium cyanamide/urea compositions (e.g., a pH greater than about 8) appear to quickly reach and enter plants through the root system and simultaneously inhibit growth of root parasites (e.g., nematodes and fungi). Furthermore, the persistent soil amending properties may promote an aerobic root growth zone, less prone to anaerobic fungal parasites.

Delivery of urea and stabilized ionic compositions comprising calcium cyanamide to roots according to the disclosure also appears to be an effective method of stimulating arginine production in plants. Arginine production is associated with systemically activated resistance (SAR) in plants. Activated reproductive development, fruiting, and parasite resistance observed for plants treated with stabilized calcium cyanamide ionic compositions indicate that the method and composition of the disclosure are effective in stimulating SAR in plants. It appears that deep in soil, urea acts to stabilize acid cyanamide ions (which are very effective in stimulating plant arginine) and that conversely urea is stabilized in its dissolved state so that it does not lose its $CO_2$ component (also believed to activate arginine to a lesser extent). Surprisingly low rates of application (e.g., about 1-10 lbs/acre) of calcium cyanamide are very effective in eliciting apparent SAR effects in plants when stabilized calcium cyanamide ions are provided in low calcium cyanamide/urea ratio compositions according to the disclosure.

Perhaps one of the most surprising discoveries disclosed herein is that no non-contributing additives (in the sense that they do not act as plant nutrients) or unusual methods are required to obtain the desirable composition qualities according to the disclosure. Rather, it appears that the components of the disclosed composition contributed from commercial calcium cyanamide alone or in combination with nitrogen-containing materials such as urea and animal excreta are sufficient to provide for self-stabilization. Furthermore, the disclosed composition and method provide enhanced efficiency of each of their components in a synergistic fashion not otherwise achievable.

Without restricting the disclosure to a particular theory of operation, it currently is believed that the disclosed composition and method not only facilitate initial dissolution and hydrolysis of normally hydrophobic and difficult to wet calcium cyanamide, but also serve to arrest hydrolysis and preserve beneficial soluble calcium ions and acid cyanamide ions both in solution and in soils.

The interplay of the components that appears to provide the advantages attributed to the disclosed composition and method may be at least partially understood by reference to the following reaction scheme.

The effect of inhibiting aeration on the stability of aqueous calcium cyanamide compositions may be understood by recognizing that calcium ions combined with dissolved carbonate ions ($CO_3^{2-}$) will precipitate as calcium carbonate ($CaCO_3$). Carbonate ions, which may be formed through the dissolution of carbon dioxide from the atmosphere, are depleted by precipitation with calcium ions. In order to maintain equilibrium with the atmosphere, the solution will absorb carbon dioxide to replace the carbonate ions. As seen in the scheme above, carbonate ions are not formed directly from carbon dioxide, but rather are formed from carbonic acid ($H_2CO_3$) that results when water and carbon dioxide react. Carbonate ions are available only after carbonic acid has lost it two protons. These protons will be neutralized by available hydroxide ions, and as hydroxide ions are neutralized, the pH drops. Thus it may be seen that preventing additional carbon dioxide from dissolving in aqueous calcium cyanamide compositions will maintain the high pH initially obtained.

If the pH of an aqueous calcium cyanamide composition drops significantly below 10.3, molecular cyanamide ($H_2NCN$) will predominate. As can be seen from the bottom set of reactions in the scheme above, molecular cyanamide is one step closer to urea [$CO(NH_2)_2$] than the acid cyanamide ion. Hydrolysis of molecular cyanamide to urea may then be followed by rapid conversion to ammonium ($NH_{4+}$) and nitrate ($NO_3^-$), which may be lost from soils by volatilization and leaching respectively.

The synergistic stabilization of nitrogen-containing material and calcium cyanamide by the method and composition of the disclosure may be understood by considering what effects each may have upon the other, especially when aeration is inhibited. Since acid cyanamide ions are believed to function as urease and nitrification inhibitors they will tend to prevent conversion of urea to ammonia and nitrate. Stabilization of the high pH state (e.g. a pH greater than about 8) according to the disclosure provides a stable solution containing acid cyanamide ions. Thus, because acid cyanamide ions appear to prevent loss of urea, fewer acid cyanamide ions will be converted to urea in order to maintain equilibrium in the system. Furthermore, if urea or other nitrogen-containing material that provides urea is added, especially in excess, at least three effects may be evident. First, additional urea may

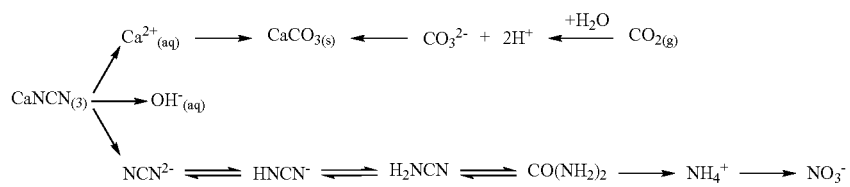

Ignoring for now the carbon and calcium carbide components of commercial calcium cyanamide, dissolution of calcium cyanamide and calcium oxide will provide a solution of soluble calcium ions, hydroxide ions, and cyanamide ions. Cyanamide ions ($NCN^{2-}$) will quickly react with water to form acid cyanamide ions and additional hydroxide ions. The hydroxide ions produced during initial dissolution of calcium oxide and reaction of cyanamide ions with water may be sufficient to raise the pH above 10.3 where acid cyanamide ions ($HNCN^-$) are favored. It is desirable to maintain the mixture in this state to provide soluble calcium ions, high pH, and available acid cyanamide ions.

serve to shift the various equilibrium reactions toward the cyanamide ion, thereby stabilizing greater amounts of the acid cyanamide ion. As stated before, the acid cyanamide ion may prevent urea loss. Therefore, a second effect may be that acid cyanamide ions stabilize themselves by preventing loss of urea. Furthermore, the combination of (1) a pH of between 8 and 10 and (2) the presence of calcium hydroxide (also preserved by inhibiting aeration) may lead to formation of dicyandiamide, which may also contribute to the synergistic stabilization.

Another possible effect that may be operative in the composition and method according to the disclosure is that nitrogen-containing material such as urea and manures appear to enhance dissolution of solid calcium cyanamide. In doing so, nitrogen-containing materials apparently provide increased concentrations of acid cyanamide ions, more quickly, thereby leading to rapid stabilization of the nitrogen-containing material at the urea stage. As noted already stabilization of urea can synergistically lead to stabilization of acid cyanamide that helps to stabilize the urea.

Other effects disclosed herein are not so clearly rationalized on the basis of the above reaction scheme. For example, it is unclear as to why or how urea and manures function to inhibit aeration, or further if inhibition of aeration is even their mode of action in stabilizing the disclosed compositions. Regardless, the stabilizing effect of urea and manures is clearly demonstrated in the present disclosure. Also unclear is why urea alone or in combination with calcium cyanamide is observed to be such an effective soil amendment. Perhaps, at least in case of urea/calcium cyanamide combinations, the soil amending properties are a result of unexpected polymeric products, for example, of the type seen when heterogeneous calcium cyanamide core/urea shell materials are left standing with exposure to air.

The foregoing explanations may be better illustrated by the following examples. Other aspects and advantages of the present invention are illustrated in these examples which are provided solely for purposes of illustration. The scope of the present invention should not be limited to those features described in these examples.

Example 1

Compositions Comprising Calcium Cyanamide

Aqueous fertilizing and bioactive compositions comprising calcium cyanamide are described in Hartmann, U.S. Pat. Nos. 5,698,004 and 5,976,212, which patents are incorporated herein by reference. The present invention concerns novel calcium cyanamide compositions that are useful for practicing the methods set forth in these prior U.S. patents, as well as for the new uses disclosed herein. These novel compositions have three basic forms: (1) a heterogeneous composition (e.g., a composition comprising discrete layers of materials) comprising a calcium cyanamide core and at least one coating layer comprising a nitrogen fertilizer, such as urea; (2) a homogeneous composition where calcium cyanamide and a nitrogen-containing fertilizer are substantially uniformly mixed together; and (3) a liquid composition comprising hydrolyzed calcium cyanamide plus nitrogen fertilizers. These compositions provide calcium cyanamide in easily handled forms that allow accurate and uniform application of nitrogen fertilizers and calcium cyanamide. Each of these compositions is described in more detail below.

A. Heterogeneous Granules

An embodiment of a heterogeneous granule is depicted in FIG. 1, which shows that granule 10 comprises a core 12 substantially coated with a shell of nitrogen-containing material 14. Core 12 may comprise calcium cyanamide, urea, combinations of calcium cyanamide and urea, or combinations of calcium cyanamide and/or urea and other nitrogen-containing materials. Components of commercial calcium cyanamide also may be used as the core material. For example, particles comprising calcium oxide, calcium carbide or dicyandiamde can be used. FIG. 1 also shows that the granules optionally can include additional material layers, such as optional layers 16 and 18. These optional additional layers can be formed from any of a variety of materials including, without limitation, additional layers of calcium cyanamide (or its components), additional layers of a nitrogen-containing material, such as urea, additional layers of traditional fertilizers or soil amending materials, pH-adjusting materials, such as super phosphate, minerals, such as sulfur parafinic materials, talc, etc. Moreover, the calcium cyanamide layer 12 need not be pure calcium cyanamide, but could also be a mixture of calcium cyanamide and other materials, such as nitrogen-containing fertilizers, including urea. Likewise, coating layers 14, 16 and 18 need not be pure materials, and also can comprise mixtures of materials.

A currently preferred embodiment of granule 10 comprises a substantially pure calcium cyanamide core 12 substantially surrounded by a substantially pure urea layer 14. A working embodiment of such a granule 10 was made by selecting sized granules of calcium cyanamide and spray coating them with molten urea. A particular method is to repeatedly apply thin coats of urea to calcium cyanamide "seeds" as they continuously tumble in a pan granulator. The final product has an "onion skin" appearance in cross-section. Heterogeneous granules of similar size but differing ratios of calcium cyanamide-to-urea have been produced by varying the size of the calcium cyanamide seed. For example, one percent calcium cyanamide/99% urea heterogeneous granules were formed from calcium cyanamide seeds that were about 0.6 mm in diameter. Five percent calcium cyanamide/95% urea granules were formed from calcium cyanamide seeds that were about 1 mm in diameter. For both compositions, the final product was selected to be about −7+8 Tyler mesh.

Selecting calcium cyanamide seeds of different sizes to form core 12 allows production of granules 10 having different ratios of calcium cyanamide to urea. Because the calcium cyanamide seeds are irregularly shaped, calcium cyanamide seeds were selected by sieving granulated calcium cyanamide particles to provide seeds having a narrow size distribution. Alternatively, the thickness of the urea coating may be changed to vary the composition of the granules.

It is possible to produce heterogeneous granules 10 having virtually any ratio of calcium cyanamide-to-urea ratios. Thus, the calcium cyanamide-to-urea ratios can vary from about 0.1/99.9 to 99.9/0.1. The amount of calcium cyanamide preferably ranges from about 0.1% by weight to less than about 30% by weight, more preferably from about 0.1% to less than about 20% by weight, even more preferably from about 0.1% to less than about 10% by weight, and typically less than about 5%, the balance being nitrogen-containing materials, such as urea, and any other material that may be chosen to make useful compositions. Compositions having relatively low amounts of calcium cyanamide are preferred for agricultural applications, while granules having relatively high ratios of calcium cyanamide-to-urea are desired to improve the handling, shipping, and storing properties of the calcium cyanamide.

Granules 10 as described herein can be made by a representative apparatus for the production of granulized material, such as that described in Shirley, U.S. Pat. Nos. 4,213,924, 4,424,176 and 4,506,453, which are incorporated herein by reference. Briefly, heterogeneous calcium cyanamide granules were made using a granulating apparatus 20 schematically depicted in FIG. 2. Apparatus 20 comprises a stainless steel tube melter 22. Melter 22 typically operates at about 300° F. to make granules 10 as depicted in FIG. 1. Melted materials from melter 22 are collected in a pump tank 24 fitted with a variable speed agitator 26. Any condensate can be discharged through a gas outlet 28. A valve (not shown) regulates the flow of nitrogen-containing material, such as urea.

Pump 30 draws the nitrogen-containing material through heated, jacketed stainless-steel conduits 32. Pump 30 operates with compressed air provided by a compressed air source 34 and provides a stream of nitrogen-containing material first into a prilling tower 36 and thereafter into a granulation drum 38. Pump 30 can be used to increase the pressure as desired, such as increasing the pressure from about 20 psig to about 300 psig. Materials evolved from within granulation drum 36 are guided through scrubber 40. Example 2 below provides additional detail concerning how to make calcium-cyanamide core materials comprising urea layers, as illustrated in FIG. 1.

B. Homogeneous Compositions

The preceding section described embodiments of heterogeneous composition according to the present invention comprising calcium cyanamide and discrete layers of additional materials coated over the calcium cyanamide core. Useful compositions also can be made that do not include discrete layers of materials. These materials generally have calcium cyanamide substantially uniformly mixed with other materials, such as nitrogen-containing fertilizers, particularly urea. These material also can be made using the apparatus illustrated in FIG. 2. Such heterogeneous compositions can include calcium cyanamide in amounts substantially identical to that described above, such that the amount of calcium cyanamide preferably ranges from about 0.1% by weight to less than about 30% by weight, more preferably from about 0.1% to less than about 20% by weight, even more preferably from about 0.1% to less than about 10% by weight, and typically less than about 5%, the balance being nitrogen-containing materials, such as urea, and any other material that may be chosen to make useful compositions.

It is possible to include other plant fertilizing materials, nutrients and soil amendments in embodiments of the compositions of the present invention. Other plant fertilizers, nutrients and soil amendments include, but are not limited to, phosphorous, potassium, iron, copper, zinc, manganese, sulfur, boron, magnesium, molybdenum, and mixtures thereof. A more exhaustive list of plant nutrients, including micronutrients, is found in the official publication of the Association of American Plant Food Control Officials (AAPFCO), volume 53, 2000, which is incorporated herein by reference.

For the solid compositions, additional plant nutrients and soil amendments may be added to the calcium cyanamide phase, the nitrogen fertilizer phase, or both phases. The solid compositions may also include additional coatings, such as urea-formaldehyde, to further enhance the mechanical strength. The composition also may have additional hydrophobic layers, such as parafinnic hydrocarbons or sulfur, to slow the dissolution of the solid compositions. Other nitrogen-containing compounds may be substituted for the urea as a coating. Examples of other suitable nitrogen-containing fertilizer compounds include manure, organics, including composted materials, ammonium sulfate and ammonium phosphate. Additional nitrogen-containing compounds useful for forming calcium cyanamide/nitrogen fertilizer granules can be found in the official publication of the AAPFCO.

It also is possible to produce homogeneous solid compositions by dehydrating any of the liquid compositions according to the disclosure.

C. Liquid and Contained Liquid Compositions

Liquid compositions according to the disclosure are generally of two types, aqueous compositions comprising calcium cyanamide and nitrogen-containing materials; and self-stabilizing, aqueous compositions of calcium cyanamide alone. Additional plant nutrients and soil amendments may be easily dissolved or suspended along with calcium cyanamide and nitrogen-containing fertilizers in these compositions.

Compositions of the present invention can be transported and/or sold in containers. It has been surprisingly determined that containers, particularly those having gases in the headspace of such containers, facilitate anaerobic/non-aerated stabilization of the compositions of the disclosure. Stabilization generally, but not necessarily, refers to stabilizing the pH and soluble ion content of the present compositions.

Without limiting the present invention to one theory of operation, it appears that factors, which stabilize or otherwise favor the formation of the acid cyanamide anion (and possibly dicyandiamide) are beneficial for most uses described herein. This is discussed in more detail below in Example 12. It has been noted that compositions of the present invention maintain a higher pH, and hence a greater proportion of acid cyanamide anion, when they are stored in containers, or if used in non-aerated systems. It currently is believed that the addition of air, or other gas, containing carbon dioxide (which is accelerated by open-air agitation) to compositions comprising calcium cyanamide, will cause soluble calcium ions to form inactive $CaCO_3$, thereby substantially lowering the pH as more carbon dioxide is drawn into the composition, and hence reducing the soluble calcium and the amount of acid cyanamide anion present in such compositions.

Thus, one embodiment of the present invention is directed to a product comprising a container and calcium-cyanamide containing compositions as described herein. The container also can include a gas, preferably an inert gas such as nitrogen, or a gas produced in situ during storage or the manufacturing process, such as acetylene, which excludes and thus reduces the amount of carbon dioxide absorbed. Other examples of gases that may be useful for this purpose include ammonia, sulfur dioxide, argon, krypton, helium, neon, xenon, and oxygen.

Examples of such containerized products include liquid fertilizers and/or organics containing the calcium-containing compositions of the present invention. A particular example of a containerized product is manure or liquid manure to which has been added a calcium cyanamide-containing composition of the present invention. Such products are stabilized when contained or capped, or when including an inert gas in the head space of such containers. Thus, another embodiment of the invention is to avoid aerobic mixing of calcium cyanamide compositions to preserve acetylene in solution to prevent hydrolysis of urea and formation of ammonia from urea.

D. Compositions Comprising Manure and Calcium Cyanamide

As further described below especially beneficial results are obtained by using calcium cyanamide compositions of the present invention in combination with an additional nitrogen-containing fertilizer, such as manure. There is a need to find a beneficial and economical method to address the problems associated with the significant production of manures and decomposed manures, the overloading of limited lands available to high-animal density operations and the associated stench and human disease potential, by livestock, such as dairy cattle, swine and poultry. The present invention addresses this need because water-diluted manures can be combined with calcium cyanamide, and calcium cyanamide-containing compositions of the present invention to provide a beneficial liquid manure/calcium cyanamide composition. One approach is to provide containerized nutrient-fortified anaerobically and chemically decomposed, liquid-manure where manure proteins are decomposed to plant available nutrients and making a fertilizing and soil-amending composition that can be shipped for use at remote sites.

Thus, one feature of the present invention concerns providing a container for receiving liquid manure, adding water-added manures and calcium cyanamide materials as described herein to the container, including solid calcium cyanamide, liquidized calcium cyanamide such as might be produced according to the methods described in Hartmann's previous U.S. Pat. Nos. 5,698,004 and 5,976,212, and the novel homogenous and heterogeneous calcium-cyanamide-containing compositions described above. The container is then closed, and the head space of the container could then be flushed with an insert gas, such as nitrogen, to stabilize the composition to avoid pH fluctuations that may otherwise occur upon exposure to carbon dioxide-containing atmospheres.

Example 2

Heterogeneous Granules

Figure 2:
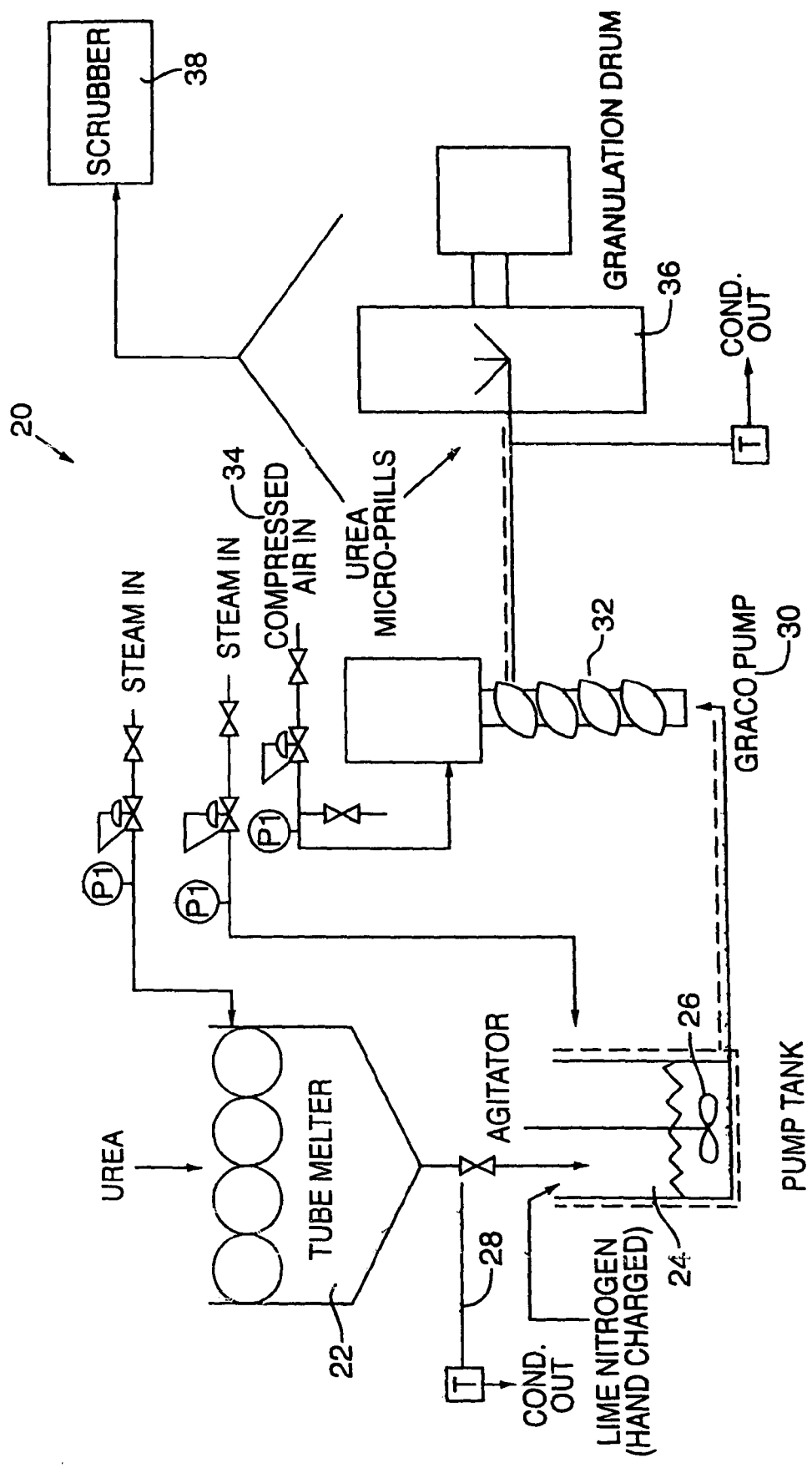
FIG. 2 is a schematic diagram of an apparatus used to make particular granular embodiments of compositions comprising a nitrogen-containing materials, such as urea, and calcium cyanamide.

This example describes one method for making heterogeneous granules, such as those illustrated in FIG. 1, comprising a hydrophobic calcium cyanamide core and at least one urea layer. With reference to FIG. 2, about 768 grams of feed-grade urea prill was applied to the stainless steel tube melter 22 at 55-60 psig. The melter 22 was heated to about 305° F. to ensure that the urea melted within 30 seconds, thus avoiding unwanted production of biuret. The melt was collected in a pump tank 24. Any condensate was discharged through gas outlet 28. Pump 30 was used increase the pressure from 20 psig to from about 200 psig to about 300 psig.

Approximately one pound of calcium cyanamide granules of the appropriate diameter were added to the pan granulator. The pan granulator included lifting flights mounted 1.5 inches apart inside the drum to provide a curtain of granules to which the molten urea was applied. The drum was mounted on a variable speed base (not shown) and the drum speed was kept at 35-40 rpm. Very thin films were applied as the hard, rough "seed" fell through the atomized spray mist. The temperature of the spray was kept at about 210° F., and particularly below about 220° F., to prevent the formation of fine particles of dust-like urea. A hydraulic nozzle and 200-mesh stainless steel strainer were used to provide the molten solution at from about 200 psig to about 300 psig. Scrubber 38 was used to remove escaping fine particles.

The granule takes up the heat from the molten urea and the urea freezes on to the seed. The urea plus calcium cyanamide granules were continuously recycled into the granulation drum until the granules reached a desired particle size of –6, +12 or –7+8 Tyler mesh. The coating process yielded a layered granule that has the appearance of an onion in its cross-section. The final product was virtually spherical, very hard and dustless. The resultant product was sieved through a plurality of screens to provide granules having a narrow size distribution.

Tests revealed that the process did not significantly lower the total Kjehldahl nitrogen of the two components.

A hardness test was conducted on granules 10 made as described in this Example 1. The granules tested had 1% and 5% calcium cyanamide/urea formulations. Both exceeded 9 pounds at –6+7 Tyler mesh and 7 pounds at –7+8 Tyler mesh. Thus, these granules satisfy industry standards and the coating process is highly desirable. The product is free flowing and is nonhygroscopic.

Example 3

Homogeneous Granules

Homogeneous granules were formed in a manner similar to the granules of Example 1 except that they were formed around a small "seed" of urea. About 768 grams of feed-grade urea prill were fed to stainless steel tube melter 22 at 55-60 psig. Melter 22 was heated to about 305° F. to ensure that the urea melted within 30 seconds to avoid unwanted biuret production. The melt was collected in a pump tank 24 fitted with a variable speed agitator 26. Any condensate produced was discharged through a gas outlet 28. A valve (not shown) regulates the flow of urea. Powdered calcium cyanamide was hand fed into the pump tank 26 and agitated to prevent settling while it mixed with the urea melt.

Several different compositions have been made, including 1% and 5% by weight calcium cyanamide/urea. The pump 30 operated with compressed air and provided a stream of urea+calcium cyanamide through jacketed stainless steel conduits 32 to the pan granulator 36. The pump 30 was set to increase the pressure from 20 psig to from about 200 psig to about 300 psig. The pan granulator 36 included lifting flights mounted 1.5 inches apart inside the drum to provide a curtain of granules to which the homogenous mixture comprising molten urea and calcium cyanamide was applied. The drum is mounted on a variable speed base (not shown) and the drum speed was kept at 35-40 rpm. Approximately 2 pounds of industrial grade urea prills as "seed" were tumbled in the drum granulation drum 36 for about 40 to 50 revolutions as urea and calcium cyanamide were sprayed into the drum. The temperature of the spray was kept at about 210° F., and particularly below about 220° F., to prevent the formation of fine particles of dust-like urea. A hydraulic nozzle and 200-mesh stainless steel strainer were used to provide the molten solution at from about 200 psig to about 300 psig. A scrubber 38 was used to remove escaping fine particles. The resultant product was sieved through a plurality of screens to obtain a Tyler screen value of –6, +12. Tests revealed that the process did not significantly lower the total Kjehldahl nitrogen.

Other nitrogen-containing compounds can be substituted for the urea, as stated earlier for the heterogeneous granules. The composition of the granules may be varied by changing the size of the urea "seed" relative to the thickness of the urea plus calcium cyanamide coating or by changing the calcium cyanamide to urea ratio in the melt.

Example 4

Hybrid Granules

This example describes a method for making hybrid granules. Hybrid granules (i.e. granules exhibiting the properties of both the heterogeneous granules of Example 1 and the homogeneous granules of Example 2) are produced by providing a calcium cyanamide "seed" and spraying a homogeneous mixture of calcium cyanamide plus urea onto the seed, using, for example, the apparatus described above.

Example 5

Homogeneous Solid Compositions from Liquid Calcium Cyanamide Compositions

This example discusses methods of making a solid composition from the liquid compositions according to the disclosure. By forming stabilized liquid compositions comprising calcium cyanamide and dehydrating them it is possible to provide solids that contain the initial dissolution and hydrolysis products of calcium cyanamide in a readily dissolvable, calibrateable, and stable form.

Dehydration of liquid compositions to provide solid materials is well known in the chemical and fertilizer arts. In its simplest form, water from an aqueous composition may simply be allowed to evaporate. However, in accordance with the discovery that inhibition of aeration serves to stabilize the beneficial properties of aqueous calcium cyanamide compositions, it is also possible to accelerate the evaporation process by using a vacuum, by bubbling a gas, such as an inert gas, through the composition, or by allowing the composition to evaporate under a protective blanket of inert gas, for example argon. Heat may also be employed to stimulate evaporation. Freeze-drying of aqueous compositions is another alternative. During freeze drying, a vacuum is used to sublime water from the frozen liquid composition.

Dehydration equipment is available from MCD Technologies (Tacoma, Wash.)

Example 6

Using Compositions Comprising Calcium Cyanamide

The methods and the compositions disclosed herein can be used for a variety of purposes. These include agricultural uses, such as fertilizing and/or soil amending compositions, as well as for disinfecting and controlling odors of certain materials, including fertilizing and/or waste materials, such as, without limitation, human waste effluents, livestock manure and waste effluents, garbage, oils, plant materials, such as vegetable waste, and paper processing materials. While not limiting the present invention to a particular theory of operation, it is believed that the disclosed synergistic compositions in use derive their efficacy in large part from a stabilization of the bioactive acid cyanamide ion and soluble calcium such as provided by calcium cyanamide and CaO/Ca(OH)$_2$. In addition, as described further below, the efficacy of the synergistic compositions may derive from the discovery of the ability of these compositions to enhance soil permeability and allow percolation of the bioactive cyanamide ion and soluble calcium ions into plants at or above ground level and deep into the soil for root uptake.

Using the methods for using and compositions described herein as fertilizing and soil amending compositions, or as odor-controlling and disinfecting compositions, typically comprises (1) forming the compositions, and (2) applying the compositions to various materials and/or locations, such as odiferous materials, particularly human and animal wastes and fluids, slaughterhouse wastes, or agricultural plots. The compositions are formed as described above. Once formed, the compositions can be applied to odiferous materials and/or agricultural plots by any suitable method, including by hand or using conventional spraying or irrigation techniques. The compositions of the present invention can be applied either as solid materials or as aqueous dispersions, including both suspensions and filtered solutions. For example, heterogeneous and/or homogeneous compositions may be made as described above and then applied to agricultural plots as solid materials. Alternatively, the compositions may be added to an aqueous solvent, decanted and/or filtered as desired, and thereafter applied to agricultural plots, such as by using conventional spraying and irrigation injection devices. The method of the present invention provides a distinct advantage in that spraying devices can conveniently be used without the heretofore ubiquitous clogging problems associated with using the conventional, substantially pure fine particles of calcium cyanamide. This not only avoids problems associated with clogging apparatuses, but also reduces the toxicity exposure problems noted in the Background section for persons handling the compositions.

Example 7

Delivery of Soluble Ions from Calcium Cyanamide Compositions

Approximately 1.8 pounds of calcium cyanamide, combined with approximately 4.2 pounds of urea per acre, further combined with water (3 gals/acre) were injected into irrigation water, which was then applied to strawberries. The application unexpectedly cured calcium deficiency leaf tip burn disease of previous fall methyl bromide pre-treated strawberries within 10 days.

Subsequently a few 5 gallon pails of Urea/CaNCN (70/30) plus approximately 14× water relative to the calcium cyanamide were delivered through irrigation water to existing plants. Within 10 days an irrigation worker noticed new reproductive plant growth with no tip burn in the row where the composition was applied. Older leaves of those plants and untreated adjacent plant leaves and new growth showed severe tip burn. The grower's Certified Crop Advisor (CCA) confirmed both reported symptoms and continued application of this composition in nitrigation of strawberries is expected. For comparison, a Salinas University of California Cooperative Extension Service publication (Crop Notes 7/00) reported tests that showed foliar application of expensive chelated calcium nitrogen sprays did not cure lettuce tip burn calcium deficiency disease, thus emphasizing the unexpected results obtained with the disclosed compositions.

The "5 gallon pails" were prepared by putting 7 lbs of urea and 3 lbs of CaNCN into the bottom of an open pail, followed by filling with water, followed by putting the lid on tight, then shaking the pail a little. The liquid was then poured into a field side tank from which liquid fertilizers are injected into irrigation water. There were no complaints of "balls and clumps" nor any plugging of drip irrigation filters or orifices.

In light of the initial success, bulk quantities of this composition were desired. In one case however, to avoid using small pails that must be hand emptied, proportionate 70/30 dry quantities of urea and calcium cyanamide were added to water in a bulk delivery tank and then, in an attempt to assure good product, the composition was mixed well. The liquid phase of the composition was successfully delivered, but hard, un-pumpable black settled clumps, which took hours to clean out, were left in the tank. Furthermore, the plants to which this well mixed composition was applied did not get results comparable to those obtained with the closed pails.

Subsequently bulk product was mixed in a vessel that could be sealed. Nitrogen was used to push the mixture out of the vessel and into the field-side irrigation tank. The results obtained were now comparable to those obtained with the closed pails. It has also been discovered that a pH meter reading of about 11.25 assures good product. In comparison, the composition that developed clumps, had a pH of less than 9.

This practical example illustrates the effectiveness of stabilizing aqueous calcium cyanamide compositions by inhibiting aeration. It also illustrates how calcium may be effectively delivered, even at low rates of application, according to the disclosure.

Example 8

Disease and Weed Suppression

Typically, strawberry growers, pre-plant their fields 6 months before harvest, spend about $300/acre to row band apply approximately 100 lbs of slow release nitrogen fertilizer per acre, and spend about $2,000/acre for about 350 lbs of methyl bromide for disease and weed suppression. The effectiveness of the disclosed methods and compositions as an alternative to the typical (and possibly soon to be prohibited) treatment by strawberry growers was investigated by observing seed germination rates and plant reproductive responses following application of an aqueous calcium cyanamide/urea composition. Contact reduction of hard coated, hard to penetrate seeds is a respected visual test for anticipating reduction of soft microorganisms and may further indicate the potential of a fertilizer to penetrate into living plant cells.

Specially made berry beds with pre-seeded radish and lettuce seeds were hand sprayed or hand drenched with a composition comprising about 40 parts of water, 7 parts of urea, and 3 parts of calcium cyanamide (70/30 composition). These hand applications were followed by sprinkler irrigation, which continued thereafter for weed seed emergence. Applications at rates equivalent to strawberry band rows at 25, 50 and 75 lbs of nitrogen per acre were compared for sprayed and drenched plots.

In the spray sprinkle plots, increased soil flocculation at the surface with increasing CaNCN rates was observed. Where the post spray sprinkling was uniform, weed germination, at the 25 lb. rate, was reduced about 25%, lettuce seed germination was reduced 100%, and radish seed germination was not reduced (0%). At the 50 lb rate, a reduction in germination of about 65% for weed seeds, 100% for lettuce seed, and 100% for radish seeds was observed. At the 75 lb rate, a reduction in germination of about 100% for weed seeds, 100% for lettuce seeds, and 100% for radish seeds was observed. However, after about 3 weeks, new weed seeds emerged in all the spray treated plots.

Apparently, in these "spray/sprinkle" treatments, the spray had already dried to some extent before the sprinklers started 1.5 hours later during hot, windy weather. Thus, it appeared that the sprinkle probably did not drive the compositions very deep in the soil and seeds remaining at depth later germinated.

In the drenched plots however, the weed seed emergence at the 25 lb rate was reduced about 70%, lettuce seed about 100%, radish seed 0%. At the 50 lb rate, 100% for weed seeds, 100% for lettuce seeds, 100% for radish seeds. At the 75 lb rate, 100% weed seeds, 100% lettuce, and 100% radish. Even more surprisingly though, no weeds later emerged. Apparently the composition was preserved in the drench until it traveled to the depth of drench. One plausible explanation is that aeration of the composition was inhibited by the rapid transport below the surface, enabling its action at depth.

A similar experiment was conducted with plots of seeded corn that were drenched with the 70/30 composition. Weed seed emergence at a 25 lbs/acre rate was reduced 90% and at 50 lbs/acre, 100%. The reproductive tillers of the seeded corn were also observed. Two tillers per plant were observed for untreated corn, 4 tillers/plant with the 25 lbs/acre rate, and 6 tillers/plant for the 50 lbs/acre treated corn. In 5 feet of corn row, the untreated had 21 small to medium ears, the 25 lb had 29 small to medium to large ears and the 50 lbs had 29 small to medium to very large plump ears. All season long, weeds never emerged in the treated plots. Thus not only were weeds inhibited by the applications, reproductive vigor was stimulated in the corn, suggesting arginine production and systemically activated resistance.

Similarly, reproductive vigor suggesting arginine production and systemically activated resistance has been observed for grapes and for roses. Simultaneously, foliar diseases were suppressed for the grapes and aphids were eradicated from the roses.

For comparison the 25 lbs and 50 lbs banded rates above, equate to 166 and 332 lbs of CaNCN per broadcast acre where CaNCN, still much lower than typically recommended applications of 1,000 lbs/acre. The urea quantities for these experiments, are typical of common fertilizer practice.

Another experiment with the 70/30 composition and hand-drenched plots, confirmed the seed emergence results just described. Plots pre-seeded with lettuce and radish seeds exhibited about a 25% reduction in seed germination at a 15 lbs/acre rate, a 75% reduction at 30 lbs/acre, and 100% reduction at 45 lbs/acre and 60 lbs/acre.

Yet another test was conducted on lettuce and broccoli plots. Immediately after the plots were seeded, four replicate plots at each of two rates were band drenched with the 70/30 composition. The rates expressed relevant to strawberry bands were 8 lbs and 16 lbs of nitrogen per acre. Where sprinkling immediately followed the drench, all plant seeds emerged. However, where the drench was allowed to dry for several days before sprinkling, the lettuce seed emergence was reduced 100%. The amount of CaNCN at the two rates were 1.5 and 3 lbs N/acre. Aqueous composition of calcium cyanamide alone were also applied as a drench at rates of 5 and 10 lbs of CaNCN N/acre and showed lettuce seed emergence reductions of 85% and 100%. This demonstrates that, even at these low rates, the amount of calcium cyanamide can be further reduced, if calcium cyanamide is combined with an excess of urea, while still providing equivalent results. Such behavior suggests a synergistic relationship between the actions of calcium cyanamide and urea that allows amounts of both to be reduced, thereby lowering costs.

The longer season, deeper rooted, broccoli plots, at these rates, expressed some delayed maturity. It is known that with dry calcium cyanamide at rates above 500 lbs per acre, such delayed maturity coincides with suppression of soil root microorganism diseases (club root). The broccoli plot did not exhibit root disease.

In another application of the 70/30 composition, Verticulum wilt of peppermint was spray cured. Thus, it is believed that such calcium cyanamide compositions are effective in reducing disease in plants.

As a result of the before mentioned strawberry bed weed responses, the 70/30 composition was compared directly with methyl bromide (MB) during the California Strawberry Commission's annual testing for alternatives to the ozone negative pesticide, which is scheduled to be 70% banned by 2003. Our chosen objective was to replace pre-banded "slow release" nitrogen with stabilized urea/calcium cyanamide compositions at a similar cost per acre and see if we could attain reduction of weeds and diseases similar to methyl bromide.

The urea/calcium cyanamide composition was applied to pre-wetted and preformed beds through drip irrigation tubes, typically 2 of which are laid inside of where two rows of berry plants will be planted on the outside bed edges. Applications of 100 lbs/acre were compared where the calcium cyanamide composition was applied over 1 hour and 2 hour periods to vary the depth and width of its distribution.

Soil samples, taken at a depth of 12" in bed centers, were sent for analysis by the Commission. The results indicated that the 1 hour treatment reduced microscopic soil eelworms (nematodes) 21%, the two hour treatment reduced eelworms 51%, and the methyl bromide was completely ineffective. It is assumed that the pre-wetting of soil required for bed shaping, caused restricted movement of the methyl bromide gas through the soil.

For comparison to the results above, a 1992 study by the University of California showed that shank injected and tarped methyl bromide at 350 lbs/acre gave nearly complete control of *Phytophthora* and *Verticillium* (100% and 73% reductions respectively). In the same study, dry incorporated calcium cyanamide at 1,000 lbs./acre gave 0% and 8% reductions. A 1991 University of California, Salina extension study on weed reduction in strawberry fields, showed that dry surface incorporation of 1000 lbs/acre calcium cyanamide, followed by 0.5 acre inch sprinkler water, reduced weeds 95%—Shank injected, followed by tarping of 350 lbs/acre methyl bromide reduced weeds 85%. In light of these other studies, weed reduction and pathogen reduction with the disclosed compositions is surprisingly effective given the low rates of application used.

Example 9

Composting Manures and Organic Matter with Calcium Cyanamide

This example describes field application tests using compositions comprising solid calcium cyanamide and liquid manure. It also discusses investigations of the properties of such compositions. Calcium cyanamide addition to liquidized manures at rates less than about 5% w/w, particularly below 1% w/w, and more particularly below 0.5% w/w, avoids loss of nitrogen from ammonia volatilization and yet provides sanitation and odor control.

Experimental roadside tests were conducted at the request of the Department of Transportation for the State of Washington to evaluate the effectiveness of calcium cyanamide/liquid manure compositions made according to the present disclosure. Liquid manure was obtained from a Washington State dairy. Approximately 500 gallons of the liquid manure were pumped into a hydroseeder. Solid calcium cyanamide was added to the hydroseeder with agitation to provide a composition comprising about 0.2% by weight calcium cyanamide to liquid manure.

Liquid manure has a pungent and organic odor. This pungent odor was substantially reduced by agitating the liquid manure in the closed hydroseeder for a period of greater than about 5 minutes, and essentially completely when mixed for at least about 20 minutes. The hydroseeder was then used to suspension-spray apply the calcium cyanamide/liquid manure composition to selected plots of land adjacent to interstate around Olympia, Wash. About 6,800 gallons/acre of the calcium cyanamide/liquid manure composition was applied to the selected plots of land.

*E. coli* levels were determined in adjacent downhill soil both prior to application and subsequent to application. These tests showed that no increase in *E. coli* was observed following application of the calcium cyanamide/liquid manure composition.

Soil pH analyses also were conducted, both prior to and subsequent to application of the calcium cyanamide/liquid manure composition. These analyses showed that application of the calcium cyanamide/liquid manure composition increased the low soil pH levels significantly. For example, soil pH measurements at 18" below ground level showed that the pH increased from about 5.6 to about 6.8. The observed pH increase is dramatic considering that typically, 2-4 tons of calcium carbonate is needed to provide a comparable pH increase.

Most roadsides are significantly contaminated with metals, primarily resulting from automobile pollution. These metals can leach into the ground water, especially under low pH (acidic) conditions that increase mobility of many metal species in soil. Carbon dioxide emitted from vehicles exacerbates the situation along roadsides because it is deposited in there in the form of carbonic acid.

The dramatic pH increases that may be obtained with the manure/calcium cyanamide compositions of the disclosure, can be used to neutralize acid buildup along roadways and stabilize metals to leaching. Without limiting the invention to one theory of operation, it generally is accepted as feasible that the soluble forms created by this composition can significantly decrease metal leaching because many metals are known to leach more at lower pHs than at higher pH values.

The plants along the roadside to which the calcium cyanamide/liquid manure composition was applied showed a significant reproductive growth increase and appeared substantially healthier than identical but diseased plants on plots of land adjacent to those to which the calcium cyanamide/liquid manure composition was applied. Thus, the calcium cyanamide/liquid manure composition of the present invention can be used for a number of purposes, including as a fertilizing and soil amending, and further to increase the pH of the soil to decrease metal leaching.

The 0.2% level of dosage was selected from laboratory tests that showed coliform reduction and soluble nitrogen increases when calcium cyanamide was added to manures, even at this very low amount. The 0.2% dosage also provided odor inhibition while minimizing ammonia losses of nitrogen.

Prior art odor and organism reduction using dry calcium cyanamide and liquid molecular cyanamide relied on high doses, vigorous mixing, and aeration that undesirably leads to ammonia volitalization. In contrast the disclosed methods are in some embodiments practiced at low concentrations, with minimal mixing, and inhibition of aeration.

Further support for the effectiveness of small doses of calcium cyanamide was provided by lab studies of a sequence of dosages mixed in bottles that were sealed. Table 1 shows the unexpectedly high and accelerated cyanamide yield of dissolved cyanamide species from solid calcium cyanamide when combined with manures. The observed levels are higher than those seen for room temperature, water only hydrolysis. Comparable yields were only observed for calcium cyanamide dissolved over longer periods of time and at higher temperatures. Whereas, in manure slurries, without vigorous mixing, in room temperature water, high cyanamide yields were attained. This appears to indicate that manure proteins or their breakdown products are effective in enhancing dissolution of solid calcium cyanamide.

Table 1 also shows the unexpected extended length (30 days—end of test) of stabilization seen for cyanamide ions, even in the unsealed manure, indicating that the contained proteinaceous matter acts to buffer (note pH stability) and preserve the components of calcium cyanamide even when aeration is not inhibited by mechanical means.

TABLE 1

| Product/ % CaNCN | Temp | Initial cyanamide yield mmol/mL | Cyanamide Yield after 30 days capped | 30 days capped, pH | Cyanamide yield after 30 days uncapped | 30 days uncapped pH |
| --- | --- | --- | --- | --- | --- | --- |
| 7% CaNCN | Room | .225 | Detectable (up to 150 days) | 12.3 | Undetectable | 7.7 |
| 7% CaNCN | 120° F. | .425 | Not timed | Not timed | Not timed | Not timed |
| 0.1% CaNCN/ manure | Room | .425 | .283 | 8.1 | .354 | 8.8 |
| 30% Urea/ CaNCN + 70% manure | Room | .425 | .350 | 12.4 | .364 | 9.2 |
| Manure | Room | | | 7.7 | | 8.7 |

Table 2 shows the acceleration of soluble nitrogen yield in sealed vessels, particularly from the feces fraction of the manure (1800%), at 0.5% CaNCN. Decomposition (composting) of fibrous, proteinaceous matter by active ions from CaNCN appears to occur under these apparently anaerobic conditions. This test was inspired by accidentally and unexpectedly detecting the familiar sulfur smell of proteinaceous breakdown while curiously checking for ammonia smell from the treated sample upon opening the cap seal of a refrigerated, treated manure sample. There was no ammonia smell. The refrigerated, untreated manure had the typical stink odor of manure.

TABLE 2

| Dairy Manure | % Nitrogen | % CaNCN added | Nitrogen (net-CaNCN/N) |
| --- | --- | --- | --- |
| Cow feces | 0.03 | | |
| Cow urine | 1.32 | 0.2 | 1.36 |
| Parlor Wash w/urine and feces | 0.09 | 0.5 | 0.54 (~1800% increase) |

Data in table 3 displays that, surprisingly, 0.2% w/w of CaNCN fines added to manures, inhibits pungent (stink) odor and lowers bacterial numbers (sanitization), with virtually no ammonia release. At higher doses, integrity of the manure is deteriorated (not numerically shown) and ammonia smell increases, especially after adding 1% CaNCN fines.

TABLE 3

| Product/ % CaNCN | Odor (stink) | Ammonia | PH | Cyanamide | Coliforms |
| --- | --- | --- | --- | --- | --- |
| Manure | 12 | 0 | 7.7 | | 16,000,000 |
| Manure/0.1% | 3 | 0 | 8.2 | 1 | 5,000,000 |
| Manure/0.2% | 1 | 0 | 9.2 | 1.4 | <20 |
| Manure/0.5% | 0 | 4 | 9.9 | 4.3 | <20 |
| Manure 1% | 0 | 12 | 11.2 | 10 | <20 |

Table 4 shows that 0.2% CaNCN reduced the numbers of coliform/*E. Coli* from 98%-99.999% in 24 and 120 hours. These are surprising responses at the very low dosage used. They emphasize how manures can stabilize and preserve initial dissolution and hydrolysis products of calcium cyanamide and highlight the fact that even steps as simple as not vigorously mixing can help minimize aeration and provide a measure of stabilization. Furthermore, some component in the manure appears to synergistically preserve/stabilize those initial forms over periods, even if uncapped (Table 1).

Table 2 above suggests breakdown of organic matter under minimally aerated or non-aerated conditions. Dissolved or undissolved proteinaceous matter in manure slurries or its decomposed (composted) soluble, perhaps polymeric, form may be responsible for stabilizing calcium cyanamide components that activate decomposition where aeration is not as rigorously inhibited.

TABLE 4

| Parlor Wash/ % CaNCN | Temp | pH | Organism | After 1 hour | After 24 hours | After 120 hours |
| --- | --- | --- | --- | --- | --- | --- |
| Manure/ 0.2% | 39° F. | 7.8 | Coliform | 8,100,000 | 7,000,000 | 230,000 |
| | | | E. Coli | 7,300,000 | 6,600,000 | 170,000 |
| Manure/ 0.2% | 94° F. | 8.7 | Coliform | 8,100,000 | 308,000 | 300 |
| | | | E. Coli | 7,300,000 | 210,000 | 200 |
| Manure | 39° F. | 8.5 | Coliform | 8,100,000 | 8,100,000 | 8,100,000 |
| | | | E. Coli | 7,300,000 | 7,300,000 | 7,300,000 |

Since commercial manure slurries have significant solids, applications of the manure/calcium cyanamide compositions may be accomplished with large hoses that have large spray spouts. In one trial, 4 lbs CaNCN fines were added to manure into a 250 gallon steel tank hydro-seeder adapted to spray slurries of polymeric soil coverings with seeds and the lid was closed. The hydro-seeder contained mixing paddles in closed steel vessels. Occasionally, clumps, thought to be parts from the manure sources were observed, however they could be pumped out.

In another trial, a 1,500 gallon portable poly spray tank, dependent on vigorous in tank bypass agitation was used. Even its large drain plugged from compaction of residual, settled, small, black balls. This, despite careful slow pouring of CaNCN fines into the agitating base manure slurry. It was discovered that commercial polymer type, pH lowering pesticide spray adjuvent, when added to the CaNCN/liquid fertilizer mixture prevented the formation of balls and clumps. However, the additive contributed nothing of additional plant nutrient value, only cost.

The balls could be seen forming immediately upon addition of the difficult to dissolve, hydrophobic, floating CaNCN fines. The problems of tank plugging prevention were corrected by pre-hydrolyzing 3 pounds of CaNCN in 5 gallon pails. The CaNCN was placed in the pail, followed by hot water, and the lid was sealed. After a little shaking and leaving the composition sit for 5-10 minutes it was poured into the manure slurry. Where the lids were not placed on the pails, carbide gas smell was obvious, and later, tank clean out was not satisfactory. However, for sealed pails, decomposition of the manure was accelerated and clog free operation was obtained thereafter.

The preceding results emphasize the value of pre-hydrolysis followed by inhibiting aeration for stabilization and activation of the components of calcium cyanamide. Furthermore, they emphasize the ability of manures to buffer such compositions, and enable clog free spraying. The manure/calcium cyanamide compositions of the present disclosure thus offer an especially effective way to deliver the soluble ions of initial CaNCN dissolution and hydrolysis along with the percolation enhancing polymers from decomposed proteinaceous manure products, which facilitate penetration down into soil profiles.

Example 10

Percolation Enhancement

Table 5 displays an unexpected discovery that urea is a persistent soil amending soil flocculent, enhanced proportionally by CaNCN, even at very low additive rates. Since many of the compositions disclosed herein comprise combinations of urea (or animal excreta breakdown products) and calcium cyanamide, percolation enhancement by urea may help explain certain observations, such as the ability of the compositions and methods to provide effects deep into soils.

The results shown in Table 5 also support a novel method of preparing soil prior to applications of other materials. Specifically, a soil pre-drench with a urea (or non-aerated, composted manure) solution will facilitate transport of subsequently applied aqueous compositions to the soil root zone, where their components may be more effectively absorbed by plants. Furthermore, the length of time that the effect seems to persist, makes it plausible that only one application of urea (composted manure) is necessary per growing season to maintain soil percolation. It is also surprising that the effect lasted so long at 86° F., an incubation temperature thought to promote urea breakdown. Persistence of the effect at high temperatures makes it useful in hot soils and hint the effect could last longer at temperate soil temperatures (for example, 50 to 65° F.). Soil percolation enhancement according to this method may be especially useful for low permeability soils were puddling tends to occur.

Figure 3:
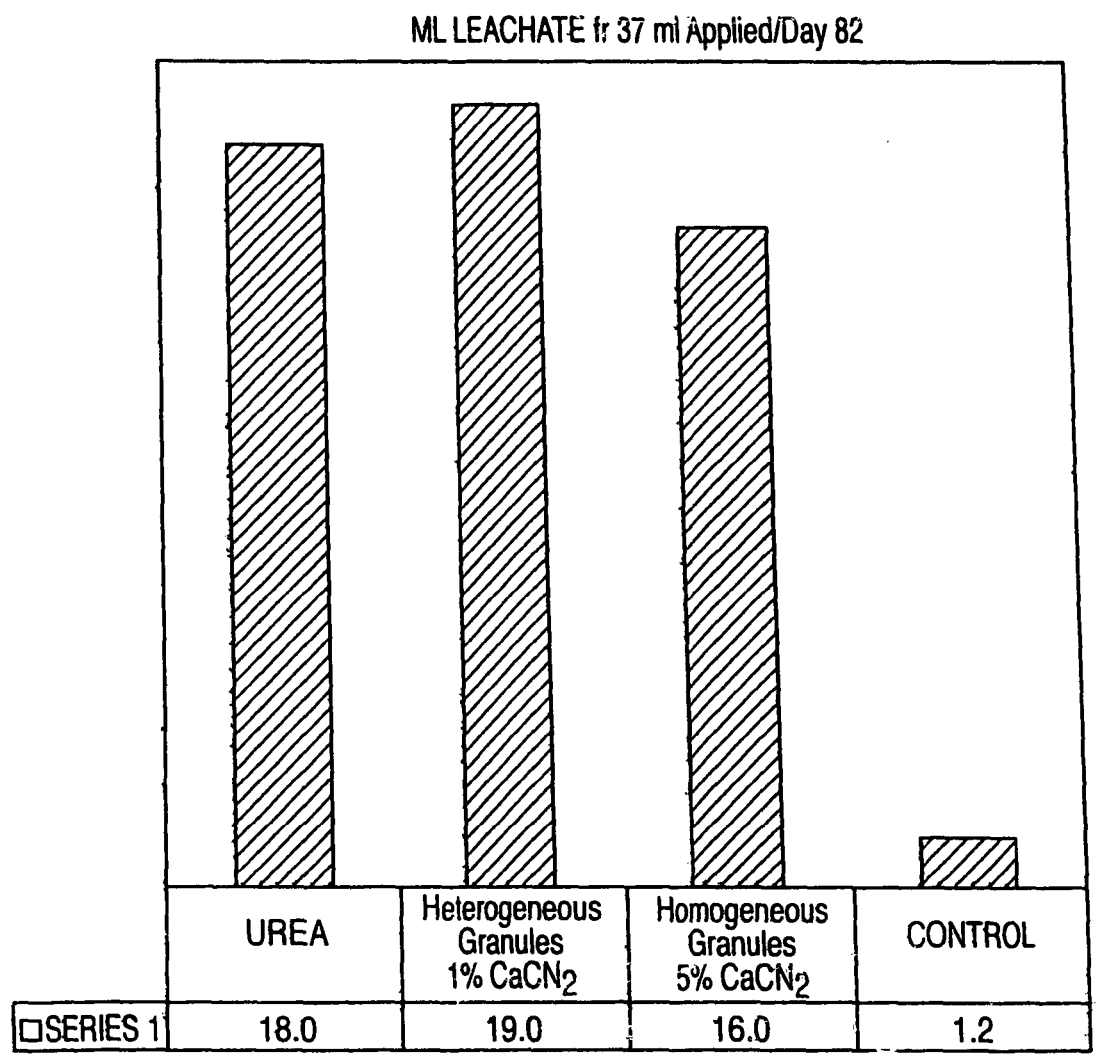
FIG. 3 is a graph of milliliters of leachate leaching from soil in bottom-perforated containers having applied thereto various compositions of the present invention versus urea and water as controls over time.

The difference in percolation between urea and urea/calcium cyanamide treated soils and untreated soils is also dramatically illustrated by FIG. 3. It shows the amounts of leachate that were obtained for 37 mL drenches on day 82 for soils treated on day one with a urea solution alone, treated with a solution formed from homogeneous calcium cyanamide/urea granules, treated with a solution formed from heterogeneous granules, and untreated. All of the treated pots showed much greater percolation of water as revealed by the increased leachate amounts. The ability of the compositions of the present invention to maintain porosity may be related to the observation of significantly higher pH, at depth, in soils treated with disclosed manure/calcium cyanamide compositions.

Because manures composted with low doses of calcium cyanamide also show this soil amending effect, it is postulated that the percolation enhancement by urea may be due to formation of polymeric materials, an effect that is accelerated in the presence of alkaline calcium cyanamide solutions. Further evidence for polymeric action is found in Example 15.

TABLE 5

Soil Water Percolation, Cumulative 145 Days after Initial Application of Product, Incubated at 86° F.

| Product | Total/mL |
| --- | --- |
| Urea | 364 |
| Urea/CaNCN 1% | 392 |
| Urea/CaNCN 5% | 382 |
| Control | 147 |

The polymeric action of urea or likely decomposition products of proteins in manures may explain why manures are known to enhance soil flocculation properties, herein facilitated by CaNCN compositions. The breakdown of manures, by ionically preserved CaNCN, to soluble polymeric nitrogen forms, may explain the exceptionally deep (18") percolation of both urea/CaNCN and manure/CaNCN solutions. This affords selective controllability over the depth to which substances may be carried into soil. A light drench or spray may be used to enhance percolation only a few inches (see Example 8) whereas a heavier drench may be used to enhance percolation deeper.

Example 11

Nitrate Leaching from Soils Treated with Solid Calcium Cyanamide and Urea Compositions This example concerns the amount of nitrate loss from soils treated with various compositions of the disclosure. Compositions made according to the method of the present invention exhibit lowered nitrate loss compared to conventional materials and controls.

Table 6 displays data showing inhibition of nitrate formation from urea conjoined with calcium cyanamide, over time, at 86° F., and at surprisingly low additive rates of CaNCN. The high incubation temperature suggests that even higher efficiencies will be achieved when the compositions are used at typical temperate soil temperatures. The low additive rates of calcium cyanamide make these compositions an effective, low-cost alternative for fall application of nutrients for spring crops, without over winter leaching losses and the attendant need to re-apply nutrients in spring.

TABLE 6

Cumulative Nitrate (ppm) Leached After Application of Product

| Product | Day 1 | Day 5 | Day 26 | Day 33 | Day 68 | Day 110 |
| --- | --- | --- | --- | --- | --- | --- |
| Urea | 0.59 | 0.68 | 0.94 | 1.06 | 1.79 | 2.90 |
| Urea/Trace CaNCN | .44 | .43 | .94 | Discontinued | | |
| Urea/0.6% CaNCN | 0.41 | 0.40 | 0.75 | 0.85 | 1.59 | Discontinued |
| Urea/1.44% CaNCN | 0.45 | 0.56 | 0.82 | 0.92 | 1.57 | 2.79 |

Comparative nitrate leaching studies were also performed on aqueous solutions made from the heterogeneous (1% and 5%) and homogeneous (1% and 5%) granules as described previously. The solutions were compared to a solution formed from pure urea prills. In each case, the aqueous solutions were formed by adding 2.70 grams of the granules (or prills or granules in the case of the pure urea) to 100 ml deionized water. These aqueous mixtures were stirred for about 30 minutes. Any undissolved material was allowed to settle for about 30 minutes. 37 milliliters were then drawn from the top of the solution and applied to a 100 gram pot of sandy loam soil. Leachate that flowed from the bottom of the pot was tested for nitrate concentration using a calibrated nitrate-selective electrode. The pots were incubated at 86° F. during the study. The pots were drenched and the leachate tested about once a week thereafter.

Figure 4:
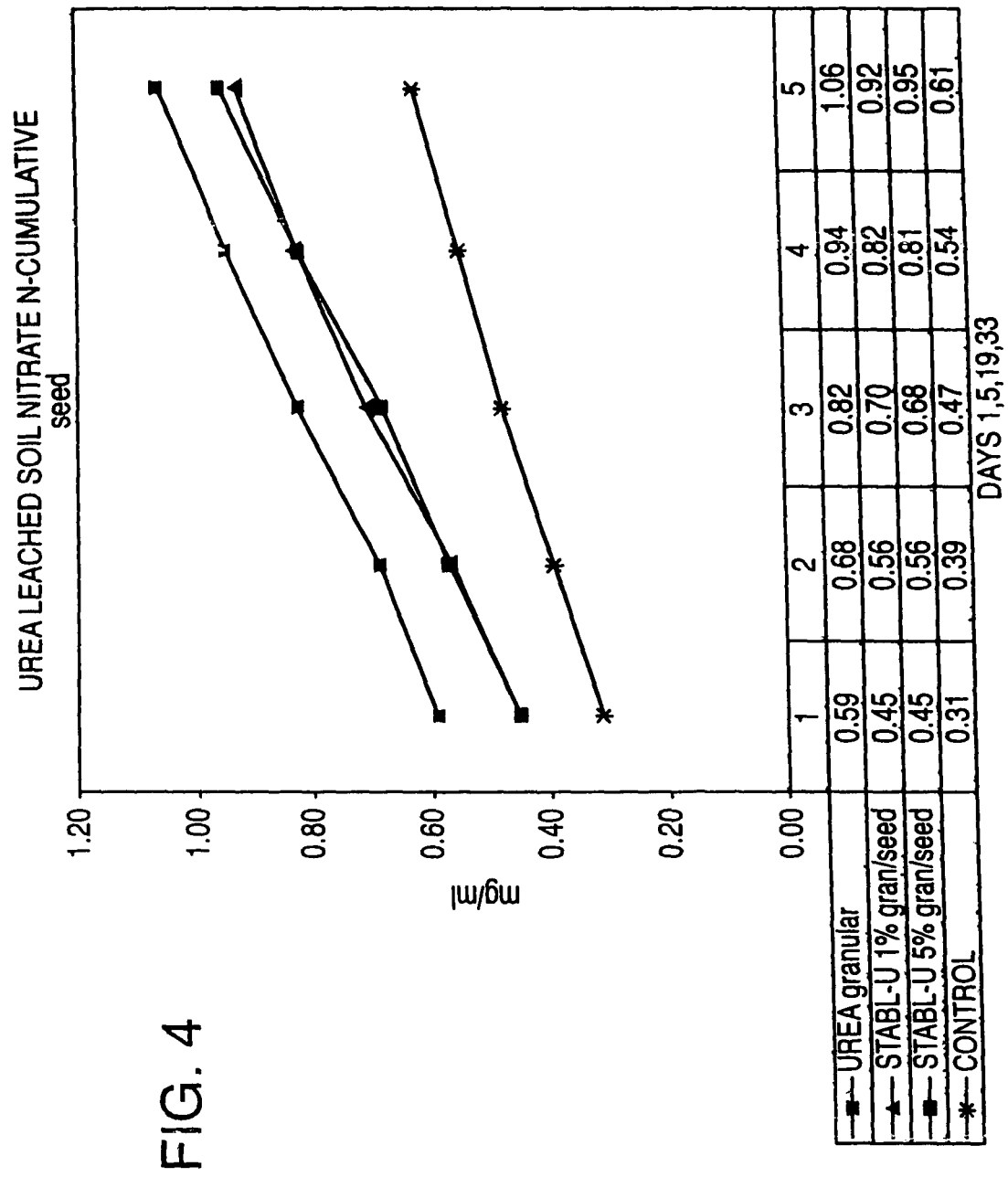
FIG. 4 is a graph illustrating the amount of nitrate leached from soil following application of urea and urea and calcium cyanamide-comprising heterogeneous compositions of the present disclosure over time.
Figure 5:
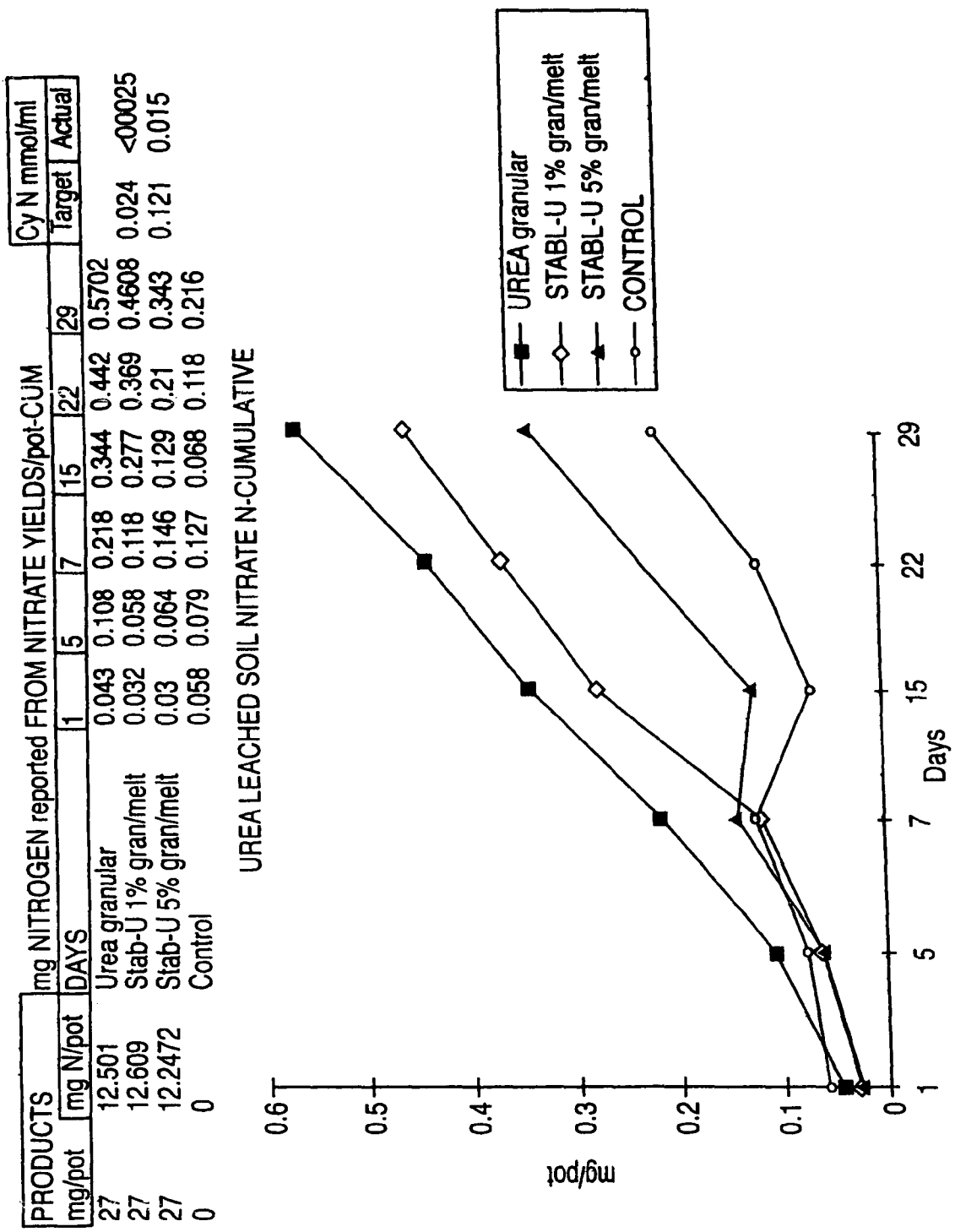
FIG. 5 is a graph illustrating the amount of nitrate leached from soil from urea and homogeneous compositions comprising calcium cyanamide and urea of the present disclosure over time.

The results for the heterogeneous granules compared to pure urea are provided in FIG. 4. The results for homogeneous granules compared to urea are provided in FIG. 5. In both cases, the control was a pot without any added nitrogen fertilizer. Compared to urea alone, all the compositions significantly reduced the amount of nitrate leached from the soil. Certain results of these tests also are shown below in Table 7.

TABLE 7

| Product | Time (days) | | | | | |
|---|---|---|---|---|---|---|
| | 1 | 7 | 14 | 21 | 30 | 60 |
| | % less than urea as control | | | | | |
| 1% Melt | 26 | 15 | 0 | 1 | 6 | |
| 5% Melt | 30 | 33 | 20 | 19 | 14 | |
| 1% seed | 24 | 18 | 15 | 13 | 13 | 11 |
| 5% seed | 24 | 18 | 17 | 14 | 10 | |

In the case of the 1% heterogeneous granule, a test after 110 days (not shown) revealed about 4% less nitrate leaching compared to urea alone. Overall, the results indicate that the compositions of the present invention can provide less nitrate leaching, and hence less nitrogen loss and environmental contamination, than urea alone.

Nitrate leaching after cornfield applications of 0.5% and 1% heterogeneous calcium cyanamide core/urea shell granules was also followed. The results of the leaching study, along with crop yields are summarized in Table 8.

TABLE 8

| Product/Location | Nitrogen (lbs/acre) | Yield (bushel/acre) | Reduction in nitrate loss referenced to ammonia (%) |
|---|---|---|---|
| Ammonia/Field 1 | 160 | 180 | |
| 0.5% granule/Field 1 | 120 | 102 | 24 |
| 1.0% granule/Field 1 | 120 | 136 | 64 |
| Ammonia/Field 2 | 160 | 177 | |
| 1.0% granule/Field 2 | 120 | 194 | 36 |

The results indicate significant decreases in nitrate leaching from dry applied heterogeneous granules, even at the low additive rates of calcium cyanamide. Furthermore, in the case of field 2, the yield with the heterogeneous granule was superior to the yield with ammonia, despite the lower amount of total nitrogen.

Example 12 pH Effects and pH Stabilization

This example describes a pH study of solutions formed from calcium cyanamide alone and in combination with and urea or manures, both capped and uncapped.

Molecular cyanamide is a weak acid with an acid dissociation constant of about $5.42 \times 10^{-11}$ at about 25° C. The acid cyanamide anion forms from molecular cyanamide according to the following equation.

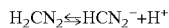

At about 25° C. in an aqueous solution with a pH of about 13.3 there will be about a 1000:1 ratio of the acid cyanamide ion to molecular cyanamide. When the pH is changed to about 12.3 the ratio will be about 100:1. At a pH of about 11.3 the ratio will be about 10:1. At a pH of about 10.3, an aqueous solution of calcium cyanamide will contain approximately equal amounts of molecular cyanamide and acid cyanamide ion. At a pH of about 9.3 there will be about a 1:10 ratio of acid cyanamide ion to molecular cyanamide. At a pH of about 8.3 the ratio will be about 1:100 and at a pH of about 7.3 the ratio will be about 1:1000.

Figure 6:
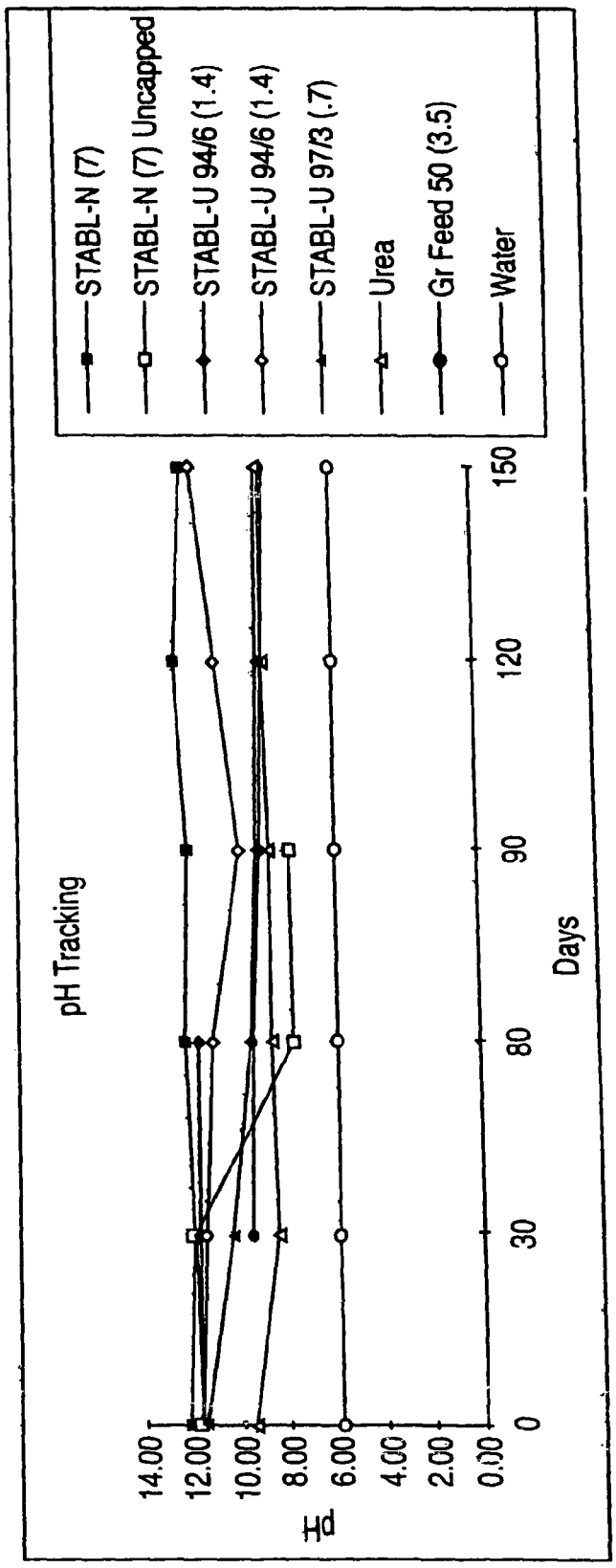
FIG. 6 is graph of pH versus time for various aerated and non-aerated aqueous compositions comprising calcium cyanamide according to the present invention versus water and urea as controls.
Figure 7:
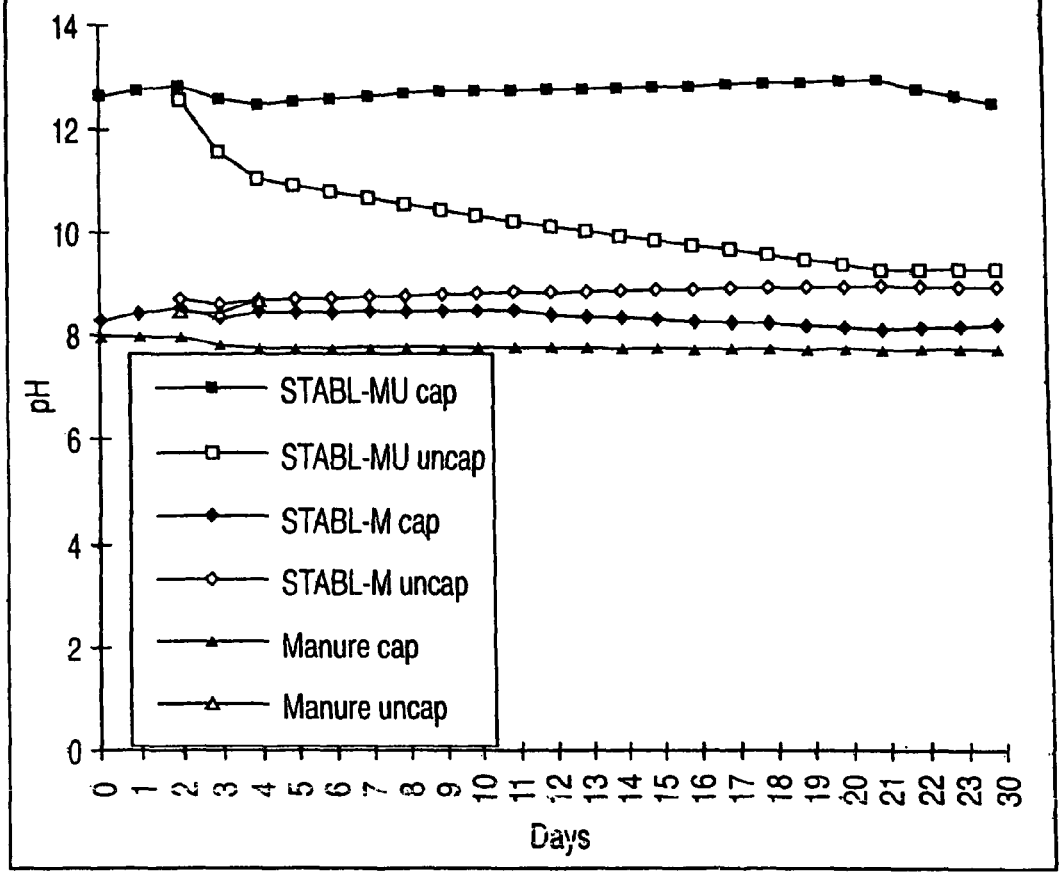
FIG. 7 illustrates the pH changes that occur over time for manure, manure plus calcium cyanamide, and manure plus the calcium cyanamide/urea granules of the present invention depending upon whether or not they are aerobically capped to retain hydrolytically evolved acetylene and exclude atmospheric carbon dioxide.

The pH of solutions made from the compositions of this disclosure was measured to determine how the pH changed when anaerobically and aerobically exposed over time in comparison with aqueous solutions of calcium cyanamide alone. The results are shown in FIG. 6. The pH of manure alone and in combination with calcium cyanamide and/or urea was also tracked in both capped and uncapped form. Those results are shown in FIG. 7.

One of the problems associated with solutions formed from the compositions described herein is the loss of soluble calcium due to absorption of carbon dioxide from the air and the subsequent precipitation of calcium carbonate. Not only does this process reduce the amount of soluble calcium it also has a tendency to decrease the pH and decrease the concentration of bioactive acid cyanamide ions.

Table 9 illustrates that even calcium cyanamide that is not mixed with buffering amounts of urea or manure can be preserved almost indefinitely as a high pH ionic aqueous solution, if aeration of the solution is inhibited (capped). Conversely, if hydrolyzed calcium cyanamide is exposed to air containing carbon dioxide (uncapped), the pH instantly begins to drop, and continues to do so gradually over a period of 30 days at room temperature. The results for the uncapped composition do indicate however, that some preservation may be achieved by simply leaving the solution undisturbed (i.e., unagitated or unmixed).

TABLE 9 pH Stability of Aqueous Solutions

| Product | Conditions | Day 1 | Day 10 | Day 30 | Day 150 |
|---|---|---|---|---|---|
| 7% CaNCN in Water | Capped | 12.0 | 12.2 | 12.2 | 12.2 |
| 7% CaNCN in Water | Uncapped | 12.0 | 8.54 | 7.7 | 7.7 |

Example 13

This example describes decreased nematode numbers as microbiological indicators following application of liquidized calcium cyanamide fertilizer compositions of the disclosure. It demonstrates, by actual nematode count, the inhibition of microbiologicals in an environment made detrimental to microbiologicals by such calcium cyanamide compositions.

This example was done under consultation with Washington State University. Agricultural plots were identified in Washington State. The number of *Meloidogyne chitwoodi* J2 larvae surviving following field-practical application of (1) Yakima river irrigation water, (2) alkaline-fertilizer, like NaOH compositions, and (3) CaNCN in liquidized compositions of the present invention to these plots were determined.

Figure 8:
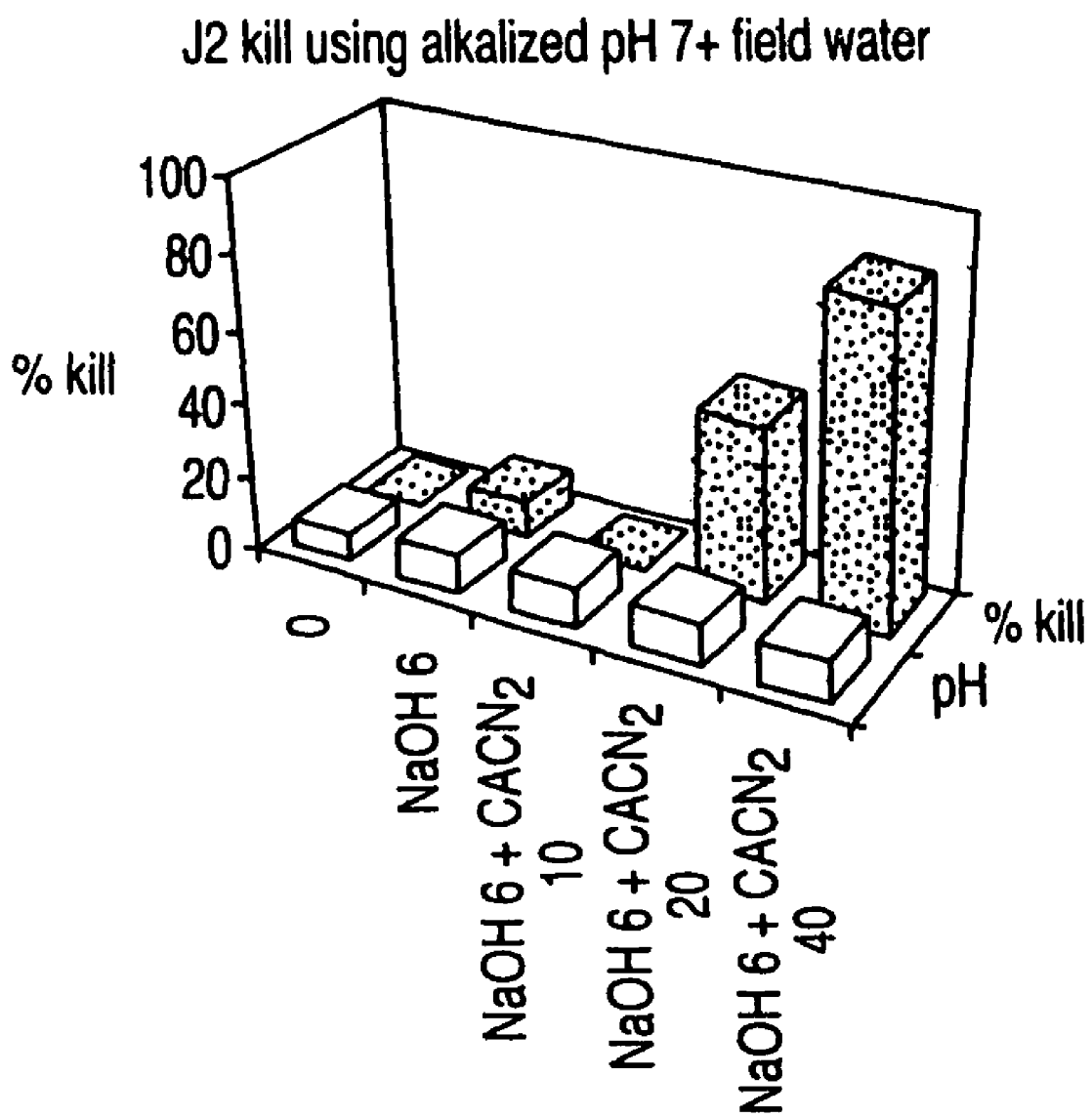
FIG. 8 is a graph illustrating the percent microbiological *Meloidogyne chitwoodi* J2 nema larvae killed following application in irrigation water, of compositions comprising caustic sodium hydroxide and calcium cyanamide compositions of the present invention.
Figure 9:
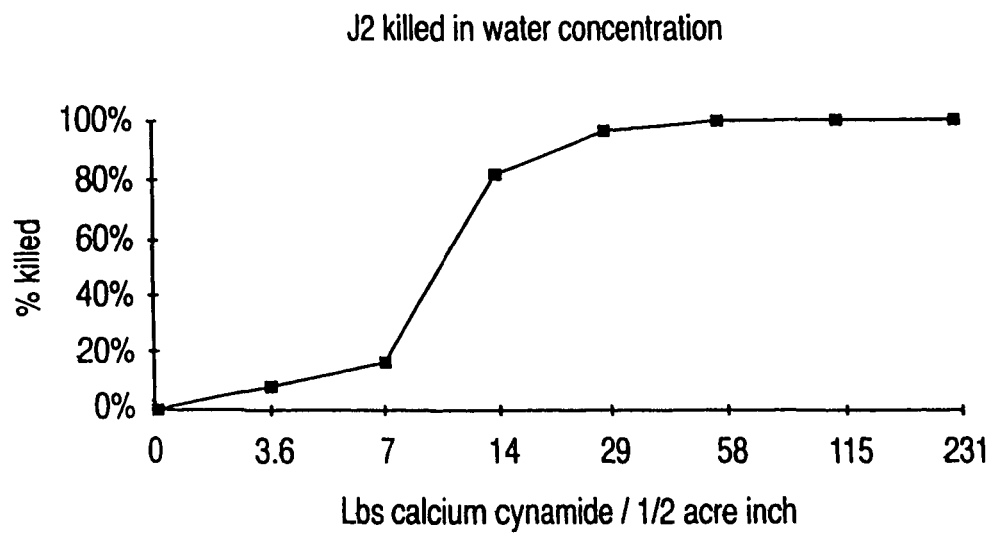
FIG. 9 is a graph illustrating percent microbiological *Meloidogyne chitwoodi* J2 nematode juveniles killed versus amount of calcium cyanamide added per acre.

The results are presented below in Table 10 and graphically in FIG. 8 and FIG. 9. With reference to Table 10, the entries concerning NaOH refer to pounds/acre used. These results clearly indicate that the synergistic calcium cyanamide compositions of the present invention substantially reduced the number of nematodes.

TABLE 10

| Material Applied (lbs/acre at ½ inch depth) | Final pH | J2 nema - % killed |
|---|---|---|
| Water only | 8.06 | 3.7 |
| CaNCN Compositions | 11.6 | 87.5 |
| NaOH 35 | 10.6 | 98.6 |
| NaOH 70 | 11.4 | 100 |
| NaOH 105 | 11.7 | 100 |

Table 11 demonstrates, using microscopic eelworms (nematodes) as a bioindicator of chemical activity, how pre-hydrolyzing CaNCN according to the disclosure dramatically increases its effectiveness at low doses. For comparison, results of some prior art studies using dry CaNCN application, liquid molecular cyanamide applications, and the results of an experiment using dicyandiamide are also included in Table 10.

TABLE 11

| Study | Product | Lbs/acre | Hyrolyzed/pH | Conditions | Nematode Reduction |
|---|---|---|---|---|---|
| French | CaNCN dry | 1200-2400 | No | Wet | 42-54% |
| | | 1200-2400 equiv. | No | Wet pot soil | 41-66% |
| | H₂NCN liquid | 112 | No | In vitro | 100% |
| | CaNCN dry | 1200-2400 | No | Dry | 4-8% |
| UC Davis | Urea | 100 | Yes, + urease | In vitro | 100% |
| WSU | CaNCN | 600-1200 | No | Field Soil, dry | 0% |
| Inventor Study, WSU | CaNCN | 9 in distilled water | Yes, pH = 12.6 | In vitro | 100% |
| Inventor Study, WSU | CaNCN | 29 in tap water | Yes, pH = 10 | In vitro | 0% |
| Inventor Study, WSU | NaOH | 35 in tap water | Yes, pH = 10 | In vitro | 99% |
| Inventor Study, WSU | Dicyan-Diamide | 102 in distilled water | Yes, pH = 8 | In vitro | 0% |

Example 14

Systemically Activated Resistance

An important aspect of the disclosure is the apparent ability of the compositions as applied according to the methods to foster systemically activated resistance (SAR) in plants. Indicators of SAR include increased disease resistance and reproductive vigor. At a molecular level, one indicator of SAR is believed to be increased levels of arginine, an amino acid.

Table 12 illustrates a summary of published data regarding the stimulation of arginine production by urea and calcium cyanamide. (Lovatt et. al., U of C. Riverside, Chapter, Am. Soc. Agronomy proceedings Calif. Plant and Soil Conf. 1992 & 1995 Wunch et. al., Institute of plant Nutrition, University of Munich, V. 12, pp 1-7, 1989) Natural plant arginine is thought to stimulate fruit development and natural plant immunity. Lovatt attributes arginine stimulation to the $CO_2$ fraction of urea, formed when urea is broken down inside plant tissue. In the case of cyanamide Lovatt also considers the response due to conversion of cyanamide first to urea and then to its $CO_2$ component. Wunch, on the other hand attributes the activity of cyanamide to the cyanamide itself. Regardless of the mechanism by which urea and cyanamide stimulate arginine production, the compositions and methods of the present invention may owe some of their unexpectedly superior properties (e.g., seen in Example 8) to the observation that they can effectively deliver stabilized urea and plant penetrating acid cyanamide ion to plant roots zones where they are more effectively absorbed by plants. Because of the mutual stabilization seen when urea and calcium cyanamide are applied together according to the methods of the disclosure, the effects are long lasting and persistent. In high urea to calcium cyanamide ratio compositions of the disclosure, it is believed that as the calcium cyanamide content is reduced the increased amount of urea compensates, thus providing enough of the combination to stimulate plant arginine production. Furthermore, urea may be function to solvate and enhance penetration of cyanamide forms into the plants.

TABLE 12

| Product | % Relative Arginine Increase |
|---|---|
| $CaNO_3$-baseline | 0 |
| Urea | 69 |
| CaNCN | 639 |

Example 15

Aerobic Dissolution Activity

The hydrolytic reactivity of the granular compositions of the present invention were compared qualitatively and revealed that the heterogeneous granular composition of the present invention are more hydrolytically active than either calcium cyanamide fines, calcium cyanamide granules, the homogeneous compositions of the present invention, and urea alone. The results are in congruence with the increased acid cyanamide ion yield for heterogeneous granules described in Example 17 below, and further support the idea that urea can function as a wetting agent for calcium cyanamide, thereby increasing the amount of calcium cyanamide that is exposed to water and hydrolyzed. They also highlight the importance of the react zone seen by microscopic examination of the heterogeneous materials.

Calcium cyanamide fines, homogeneous calcium cyanamide granules, heterogeneous calcium cyanamide/urea granules, calcium cyanamide granules, and urea were added to equal amounts of water in separate glasses and observed over time. Table 12 is a summary of those visual observations and highlights the vast differences between the aerobic dissolution properties and the chemical reactions over time of open air water solutions of CaNCN granules (1), CaNCN fines (2), homogeneous CaNCN/urea granules formed by melting together CaNCN fines and urea (3), heterogeneous CaNCN/urea granules with a calcium cyanamide core and a urea shell (4), and urea (5).

TABLE 12

| | CaNCN (pH) | | | | | | UreaCaNCN (pH) | | | | | | | | | | |
|---|---|---|---|---|---|---|---|---|---|---|---|---|---|---|---|---|---|
| | (1)Granules(12) | | | (2)Fines(12) | | | (3) Melt (7) | | | (4)Seed(12) | | | (5)Urea(8) | | | Water(7) | | |
| Hour hours days | 1 | 24 | 30 | 1 | 24 | 30 | 1 | 24 | 30 | 1 | 24 | 30 | 1 | 24 | 30 | 1 | 24 | 30 |
| Reactivity/floating | 0 | 2 | 4 | 1 | 10 | 10 | 0 | 2 | 5 | 4 | 10 | 10 | 0 | 0 | 0 | 0 | 0 | 0 |
| Particles dissolved | 0 | 2 | 2 | 2 | 7 | 8 | 0 | 4 | 5 | 3 | 6 | 8 | 0 | 9 | 10 | 0 | 0 | 0 |
| Calcium settlements | 0 | 0 | 1 | 0 | 10 | 10 | 0 | 0 | 1 | 1 | 8 | 9 | 0 | 0 | 0 | 0 | 0 | 0 |
| Meniscus (white) | 0 | 0 | 1 | 0 | 8 | 9 | 0 | 1 | 1 | 0 | 0 | 0 | 0 | 0 | 0 | 0 | 0 | 0 |
| White grainy deposit | 0 | 0 | 2 | 0 | 0 | 6 | 0 | 0 | 0 | 0 | 0 | 0 | 0 | 0 | 0 | 0 | 0 | 0 |
| White rhombic froth | 0 | 0 | 0 | 0 | 0 | 0 | 0 | 0 | 3 | 0 | 0 | 10 | 0 | 0 | 0 | 0 | 0 | 0 |
| Evaporation | 0 | 0 | 5 | 0 | 0 | 5 | 0 | 0 | 6 | 0 | 0 | 6 | 0 | 0 | 4 | 0 | 5 | 10 |

Comparatively, the calcium cyanamide fines, heterogeneous granules, and urea dissolved most quickly and completely. Calcium cyanamide granules and homogeneous granules seemed to dissolve more slowly. The difference between the dissolution properties of the heterogeneous granule and the calcium cyanamide granules, highlights the apparent ability of urea to facilitate dissolution of calcium cyanamide.

A difference was also noted in the amount of white settlements (presumably calcium carbonate) that initially appeared in the glasses on the water meniscus and then later at the bottom of the glasses. These were most apparent for the calcium cyanamide fines and the heterogeneous granule, indicating greater liberation of initially soluble calcium ions from these materials.

However, it was the reactivity behavior and the formation of deposits over time that highlighted the striking behavior of the heterogeneous granules. The greatest reactivity, evidenced by the presence of newly formed floating material was observed for the calcium cyanamide fines and the heterogeneous granules. White grainy deposits were observed for calcium cyanamide granules and fines, but were absent from the glasses containing urea alone and the homogeneous and heterogeneous granules. In contrast to the urea only glass however, white rhombic crystalline deposits that climbed the sides of the glasses were evidenced in the homogeneous and heterogeneous granule containing glasses. Even more surprising, in the case of the heterogeneous granule, the deposits actually climbed up the sides and over the lip to coat the outside of the glass.

It is suspected that for the homogeneous and heterogeneous materials, some sort of polymeric product was forming in the glasses, perhaps through hydrolytic or electrolytic action. The creeping behavior and the frothy polymeric appearance of the deposits suggest that the superior soil amending and calcium cyanamide stabilization seen for these materials in field and laboratory tests may be partly due to the formation of this material in soils. Furthermore, this material that formed in the glass may represent a new form of beneficial plant food.

Example 16

Granule Integrity

The stability of the homogeneous melt granules and the heterogeneous core/shell granules of the disclosure was followed over time. Comparatively, the homogeneous granules exhibited more structural integrity than the heterogeneous granules. However, while the homogeneous granules did not split open like the heterogeneous granules, ammonia was detected in bags containing the homogeneous granules, indicating some reactivity not evident for the heterogeneous materials.

Only very small heterogeneous granules appeared to display splitting behavior. Splitting occurred after about 3 to 6 months of storage. Closer inspection of the split granules revealed that unevenly coated and misshapen granules were more likely to split. Splitting therefore should be minimized by maximizing the uniformity of the urea shell thickness. Addition of a hardening agent, such as formaldehyde may be added to further reduce the amount of splitting.

Regardless, greater than 90% of the heterogeneous granules remain intact after extended storage and compared to calcium cyanamide alone, the granules are superior as to noxious dustiness. Even in the split heterogeneous materials, the apparent mutual dissolution (react zone) of the urea and the calcium cyanamide inhibits dust formation.

Example 17

Cyanamide Yields from Granular Compositions

This example describes the enhanced cyanamide yield that is obtained from heterogeneous calcium cyanamide fertilizer compositions. The yields of cyanamide nitrogen upon dissolution/hydrolysis of 1% and 5% homogeneous and 1% and 5% heterogeneous calcium cyanamide/urea granules in water revealed that the heterogeneous granules are capable of enhancing the yield of cyanamide ions. Without limiting the present invention to one theory of operation, this unexpected synergism may be the result of urea acting as a wetting agent for the hydrophobic calcium cyanamide particles within the urea granules, or the heat of the melted urea, or both.

Figure 10:
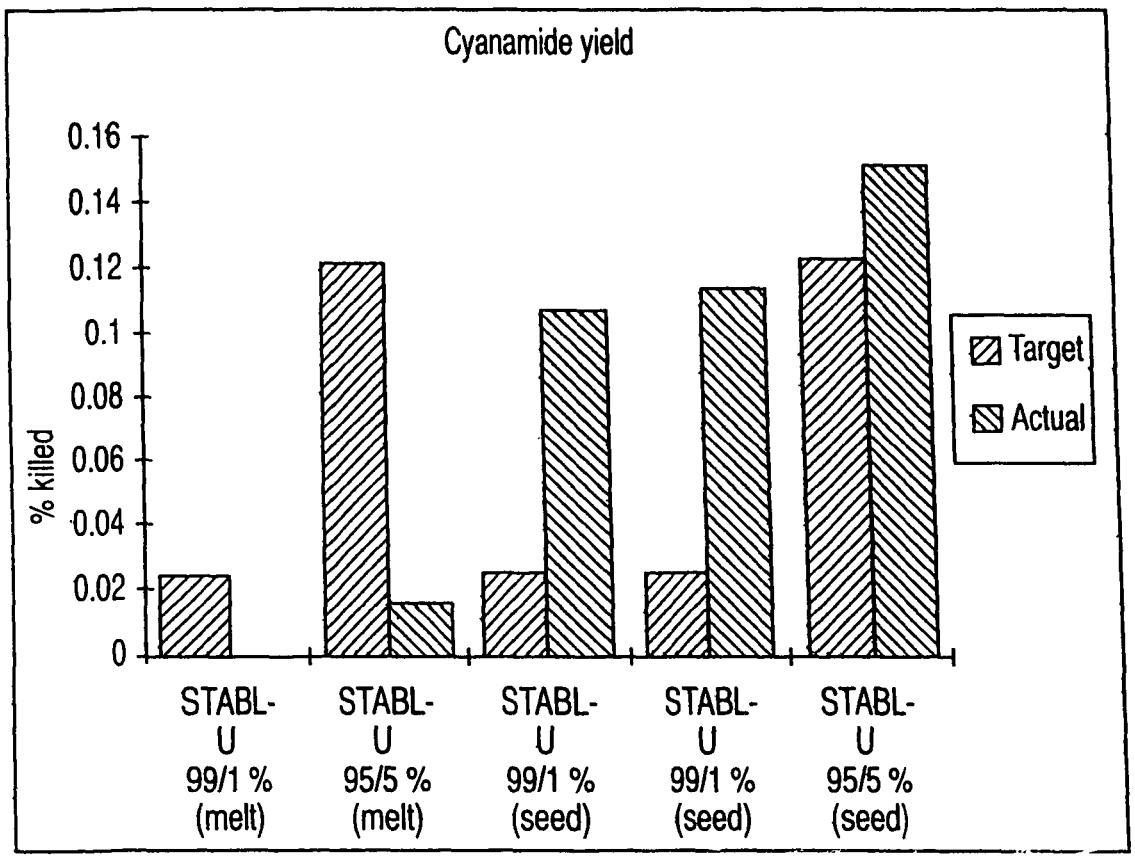
FIG. 10 is a graph illustrating cyanamide yield for various embodiments of compositions of the present invention having different amounts of urea and calcium cyanamide in homogeneous (melt) and heterogeneous (seed) embodiments.

Each type of granule (5 grams) was added to 17.5 ml of distilled water, mixed for 30 minutes, and left to sit for 30 minutes more. At the end of this period, the solution was analyzed for cyanamide anions by the method of Yoshinaga et al., *Analytical Sciences,* 10: 807-812 (1994). Briefly, cyanamide is determined by potentiometric titration with 0.1M silver nitrate in 1M NaOH using a silver sulfide, ion-selective electrode. The results are shown in FIG. 10 and indicate the superior acid cyanamide yield from the heterogeneous granules. The enhanced cyanamide yield for the heterogeneous granules may be related to urea's apparent ability to enhance dissolution of calcium cyanamide. Furthermore, these results support the hypothesis that during manufacture of the heterogeneous granules, water in the urea spray is able to initial hydrolyze the calcium cyanamide which is then sealed and preserved as additional coats of urea are applied to the growing granules.

Example 18

Controllable Release

The properties of the disclosed compositions and methods facilitate controllable release of the active ingredients that they stabilize. For example, by maintaining a non-aerated or anaerobic environment the active ingredients may be applied directly to sites where their action is desired. Furthermore, because it is also possible to control the depth of percolation of the compositions by adjusting the amount of water the compositions are delivered in, the active ingredients may be delivered to particular depths within soil or growth medium columns.

Figure 11:
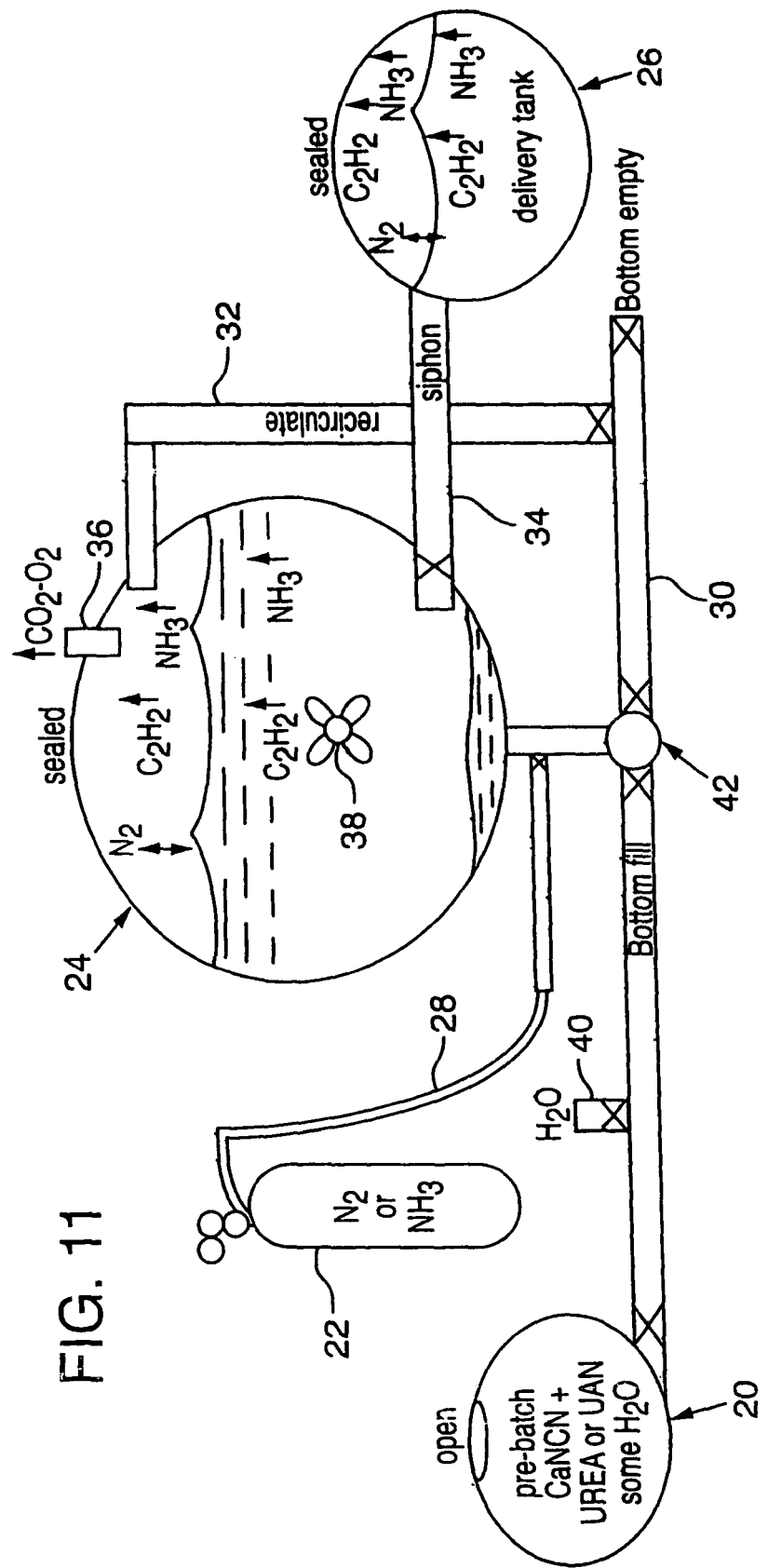
FIG. 11 is a schematic diagram of an apparatus that may be used to deliver the compositions of the disclosure as buffered airless solutions, directly to intended sites of use.

An apparatus suitable for preserving the active ingredients of the compositions described herein in a buffered airless system until application is desired is illustrated in FIG. 11.

With reference to FIG. 11, the apparatus includes container 20, which may or may not have a sealing lid, where calcium cyanamide compositions of the invention may be slurried or dissolved. The apparatus further includes sealed tank 24 that may have a vent 36 for allowing gases, such as air, to be expelled to the atmosphere. The apparatus still further includes sealed tank 26, that may be detached from the rest of the apparatus and used to deliver its contents where desired. A gas supply 22 is also included.

Conduit 30 connects tank 20 to water supply 40 and tank 24. Conduit 30 may be used to transfer premixed compositions to the bottom of tank 24, with or without addition of water from water supply 40. Gas from gas supply 22 is also delivered to the bottom of tank 24 through supply line 28. Connecting the top of tank 24 to conduit 30 is recirculating conduit 32. The contents of tank 24 may also be agitated by means of paddles 38. Liquid movement through the system is accomplished by means of pump 42. Connecting tank 24 to tank 26 is siphon 34.

In one embodiment, an aqueous slurry of calcium cyanamide fines- and urea is drawn from tank 22 by pump 42. As the material flows through conduit 30 water is added to it from water supply 40. At pump 42 the diluted slurry is directed to the bottom of tank 24. Since tank 24 is sealed, acetylene generated as the calcium cyanamide dissolves drives carbon dioxide from the water solution, the carbon dioxide entrained into the acetylene is then ejected through vent 36. This process may be enhanced by delivering an gas, such as nitrogen or ammonia, from gas supply 22 to tank 24 through supply line 28. Once the aqueous calcium cyanamide/urea composition is mixed by either recirculation by means of recirculating conduit 32 or paddles 38. The solid material left in the tank (e.g. carbon fines) may either be allowed to settle or maintained in suspension by continued mixing. In either case, the material contained in tank 24 may be transferred, without exposure to air, to tank 26 through siphon 34. Tank 26 may then be delivered, for example, to a nitrigation system and injected directly into irrigation water for application to a field.

Example 19

Heterogeneous Granules with Alternative Core Materials

This example describes a method for making heterogeneous granules, such as those illustrated in FIG. 1, comprising a core of calcium oxide, calcium carbide and/or dicyandiamide and at least one layer comprising urea. Again, with reference to FIG. 2, about 768 grams of feed-grade urea prill (with or without additional calcium cyanamide, components of calcium cyanamide, nitrogen-containing fertilizers or non-nitrogen-containing fertilizers) are applied to the stainless steel tube melter 22 at 55-60 psig. The melter 22 is heated to about 305° F. to ensure that the urea melts within 30 seconds, thus avoiding unwanted production of biuret. The melt is collected in a pump tank 24. Any condensate is discharged through gas outlet 28. Pump 30 is used increase the pressure from 20 psig to from about 200 psig to about 300 psig.

Approximately one pound of granular dicyandiamide (The Chemical Company, Jamestown, R.I.), granular calcium carbide (Fluka, Milwaukee, Wis.) and/or granular calcium oxide (J.T. Baker, Phillipsburg, N.J.) is added to the pan granulator. The pan granulator includes lifting flights mounted 1.5 inches apart inside the drum to provide a curtain of granules to which the molten urea mixture is applied. The drum is mounted on a variable speed base (not shown) and the drum speed is kept at 35-40 rpm. Very thin films are applied as the hard, rough "seed" falls through the atomized spray mist. The temperature of the spray is kept at about 210° F., and particularly below about 220° F., to prevent the formation of fine particles of dust-like urea. A hydraulic nozzle and 200-mesh stainless steel strainer are used to provide the molten solution at from about 200 psig to about 300 psig. Scrubber 38 is used to remove escaping fine particles.

The granule absorbs heat from the molten mixture comprising urea, causing the mixture to freeze onto the seed. The growing granules are continuously recycled into the granulation drum until the granules reach a desired particle size, such as a size of −6, +12 or −7+8 Tyler mesh. The coating process yields a layered granule that may have the appearance of an onion in its cross-section. The resultant product may be sieved through a plurality of screens to provide granules having a narrow size distribution.

Water (steam) may be added to the urea melt to initiate greater dissolution of the core material into the surrounding layers of the urea mixture. For example, it may be desirable to include water in the urea mixture to produce a greater amount of calcium hydroxide from a core comprising calcium oxide.

Example 20

Comparative Percolation Study of Heterogeneous Granules and Urea

Figure 12:
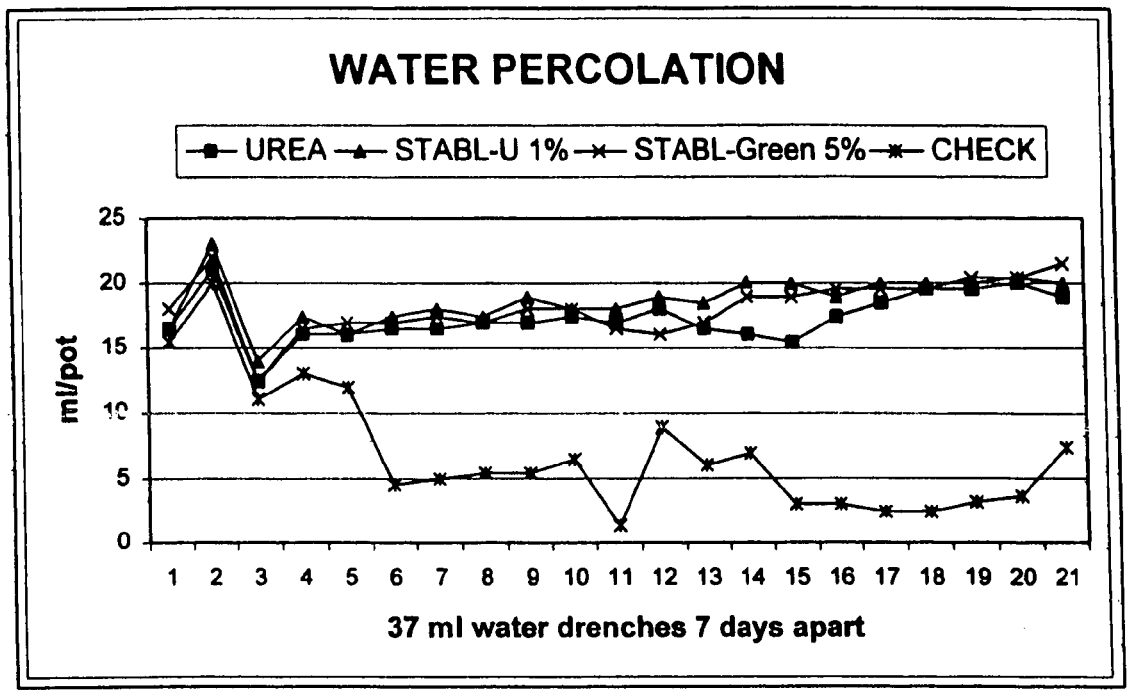
FIG. 12 is a graph showing the amount of water that percolates through soil after treatment with urea and heterogeneous compositions according to the disclosure.

In a study like that described previously in Example 10, which compared homogeneous and heterogeneous compositions according to the disclosure with urea, this example demonstrates the percolation enhancement of soils caused by heterogeneous compositions of differing percentages of calcium cyanamide and urea. FIG. 12 summarizes a 21-week percolation study. Four pots containing soil were separately treated with urea, a 1% calcium cyanamide/99% urea heterogeneous composition (Stabl-U 1%), a 5% calcium cyanamide/95% urea heterogeneous composition (Stabl-Green 5%), and water. Each week thereafter, 37 mL of water were added to each pot. The amount of water that percolated through the pot was collected, and the volume recovered was recorded. FIG. 12 shows that both heterogeneous compositions increased soil percolation equal to or greater than urea alone and the water check (control) at all time points. Although not wishing to be bound by a particular theory, it appears that the exceptional aerobic dissolution activity describe for the heterogeneous composition in Example 15 may be responsible for the percolation shown for the heterogenous materials in FIG. 12.

Example 21

Comparison with Stabilized Ureas

This example describes a comparative study of the behavior of urea, urea stabilized with a 1% calcium cyanamide core in a heterogeneous composition of the disclosure (SU), urea stabilized with a 5% calcium cyanamide core in a heterogeneous composition of the disclosure (S-GR), sulfur-coated urea (SCU), and isobutyl di-urea (IBDU), also known as occluded urea. These materials were compared with respect to nitrate leaching, and pH in solution over several weeks.

Figure 13:
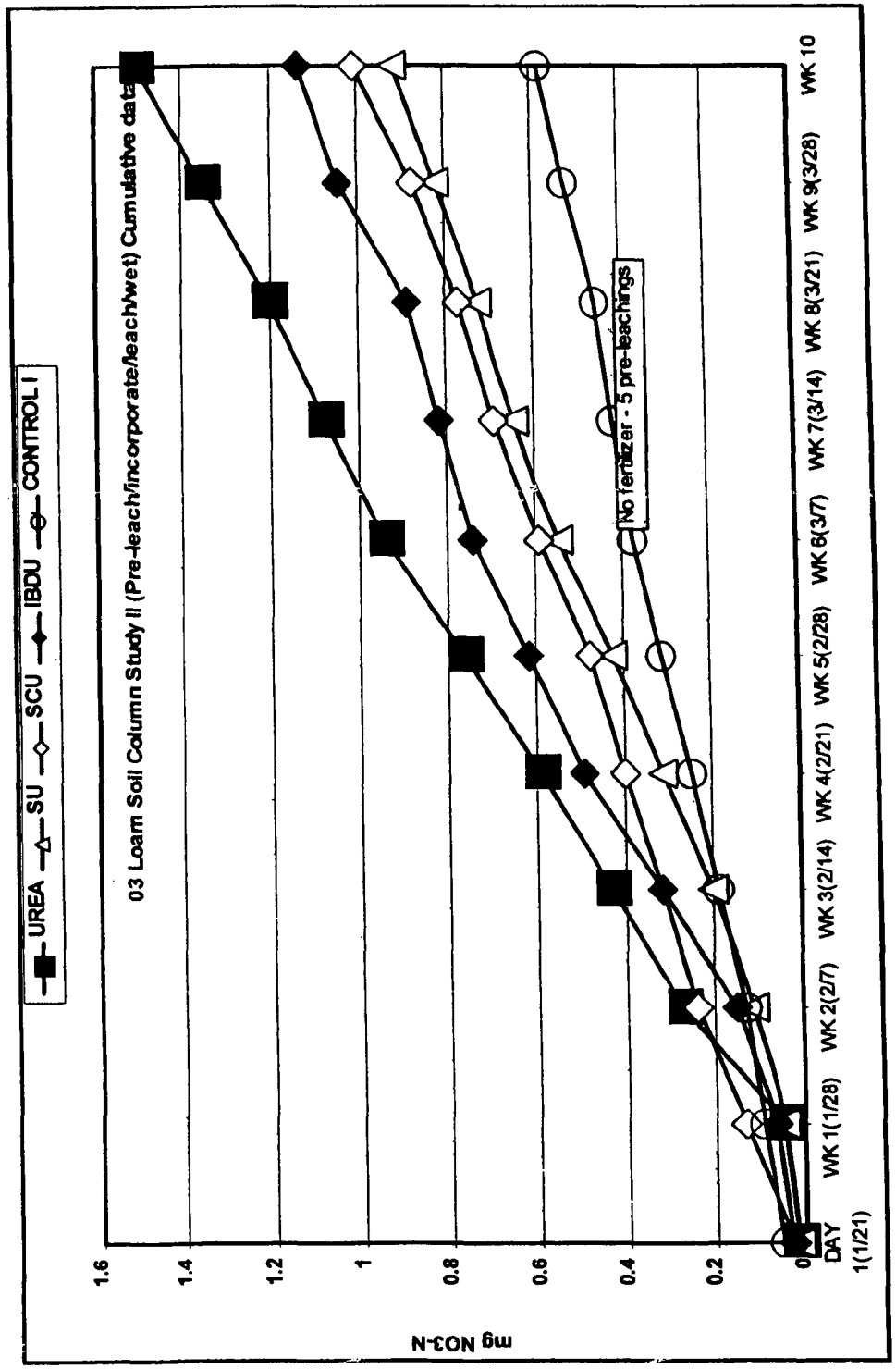
FIG. 13 is a graph showing cumulative amounts of nitrate nitrogen leached from soil columns separately treated with urea, a heterogeneous composition according to the disclosure, sulfur-coated urea, and isobutyl di-urea over several weeks.

With reference to FIG. 13, cumulative amounts of nit-ate leaching from columns of loam soil treated with urea, SU, SCU, IBDU and a control without any added nitrogen fertilizer are compared over 10 weeks. The results demonstrate that SU is more effective in preventing nitrate leaching from soil at all times than urea alone (greatest nitrate leaching as expected), SCU or IBDU.

Figure 14:
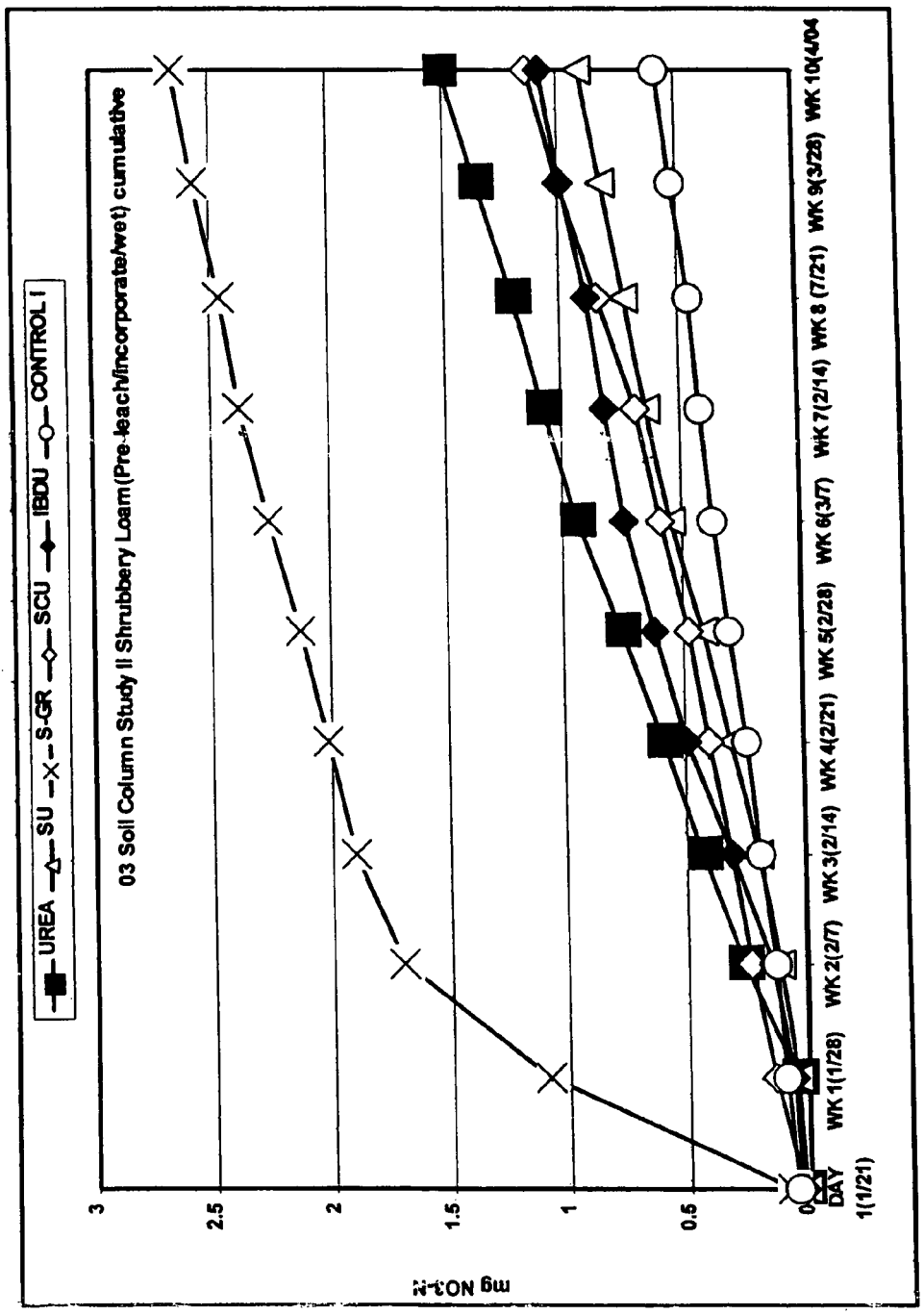
FIG. 14 is a graph showing cumulative amounts of nitrate nitrogen leached from soil columns separately treated with urea, two heterogeneous compositions according to the disclosure, sulfur-coated urea, and isobutyl di-urea over several weeks.

With reference to FIG. 14, cumulative amounts of nitrate leaching from columns of loam soil treated with urea, SU, SGR, SCU, IBDU and a control without any added nitrogen fertilizer are compared over 10 weeks. The results demonstrate that SU is more effective in preventing nitrate leaching from soil at all times than urea alone (greatest nitrate leaching as expected), SCU or IBDU. Interestingly, nitrate leaching following treatment with SGR exhibited a dramatic increase during the first 2 weeks, after which the amount of nitrate leaching out each week dropped as reflected by the decrease in the slope of the cumulative data in later weeks. In fact, during the last 6 weeks of the study the amount of nitrate leaching from the SGR treated soil column was less than seen for urea, showing that while there was a sharp initial increase in nitrate leaching for the SGR treated soil, the urea nitrogen was thereafter stabilized. One possible explanation for the observed behavior of the SGR treated soil is that due to the higher amount of calcium cyanamide (5%) in SGR, the calcium cyanamide increased formation of ammonia, which was rapidly converted to nitrate nitrogen that leached from the column of soil.

Figure 15:
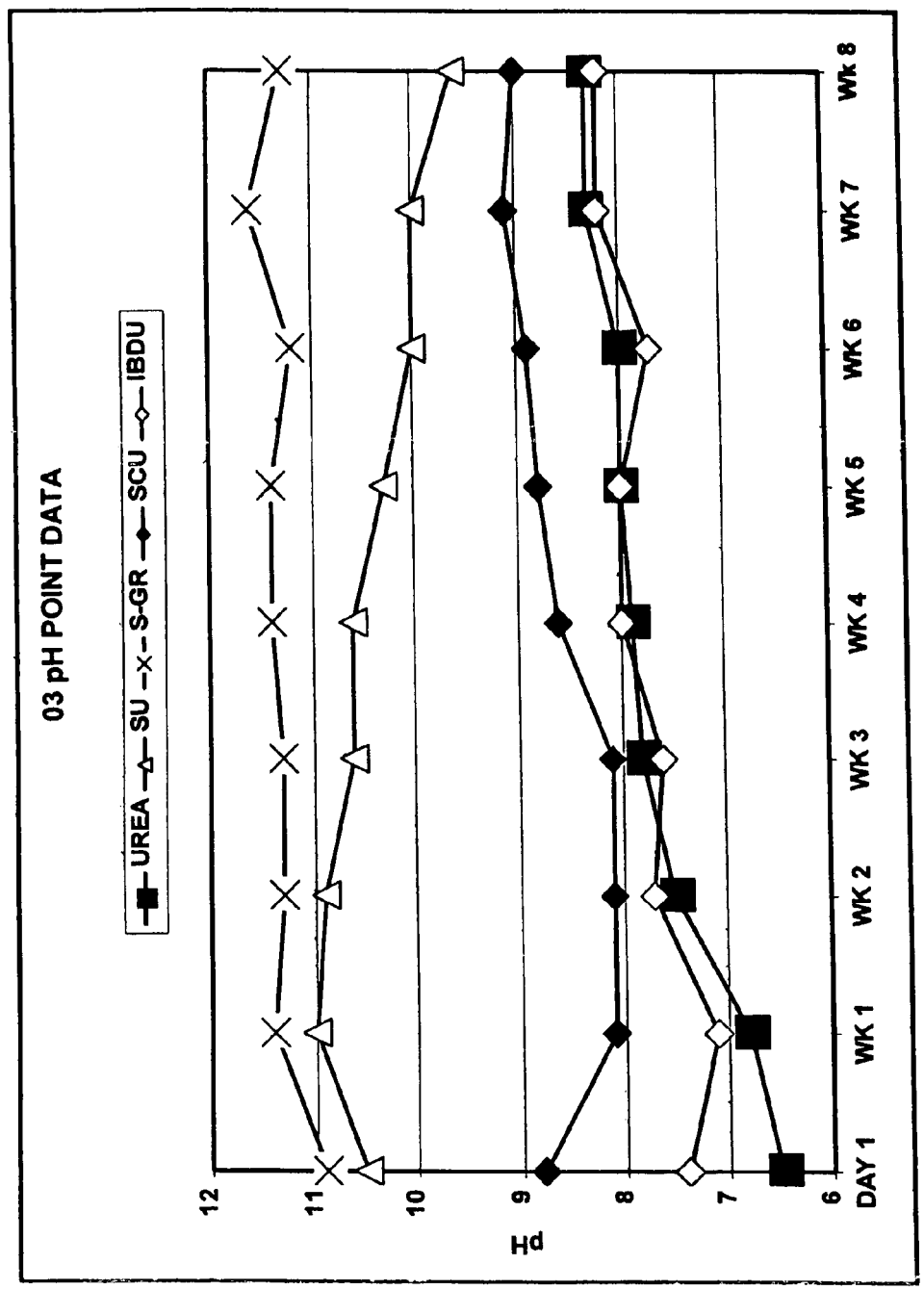
FIG. 15 is a graph showing the pH of solutions formed from urea, two heterogeneous compositions according to the disclosure, sulfur-coated urea and isobutyl di-urea over several weeks.

With reference to FIG. 15, the pH of solutions formed from urea, SU, SGR, SCU and IBDU were compared over a period of 8-weeks. The results show that a higher pH is established and maintained with SU an SGR than with the other materials. Comparatively, SGR, as expected due to its greater amount of calcium cyanamide in its core, provided and maintained a higher pH than SU. The pH study further suggests reasons why SGR exhibited higher nitrate leaching than SU as shown in FIG. 14. It is possible that ammonia production is greater at the higher pH established by SGR. It is also possible that because the pH established and maintained by SU is closer to the range of from about 8 to about 10 where cyanamide species can form dicyandiamide, dicyandiamide, a known nitrification inhibitor was produced and led to the observed reduction in nitrate leaching for SU as shown in FIG. 14.

The present invention has been described with reference to certain embodiments. The scope of the invention should not be limited to these embodiments, but rather should be determined by reference to the attached claims.

We claim:

1. A method of delivering nutrients to a plant, comprising:
    adding an effective amount of calcium cyanamide to water, where the water is in an amount at least 14× the mass of the calcium cyanamide to form a mixture;
    inhibiting aeration of the mixture by forming the mixture in a closed container; and
    applying the mixture, thereby delivering nutrients to a plant and enhancing plant growth as compared to plant growth in the absence of applying the mixture.

2. The method of claim 1 where the closed container is sealed to substantially prevent gas exchange between the container and the atmosphere.

3. The method of claim 1 further comprising inhibiting aeration of the mixture by forming the mixture in a container, the container also holding a gas selected from the group consisting of nitrogen, argon, ammonia, acetylene, and mixtures thereof.

4. The method of claim 1 where adding calcium cyanamide comprises adding calcium cyanamide in a form selected from the group consisting of calcium cyanamide fines, granulated calcium cyanamide, a homogeneous granule of calcium cyanamide and urea, a heterogeneous granule of calcium cyanamide and urea, an aqueous composition of calcium cyanamide dissolved in greater than 14× its weight in water, and mixtures thereof.

5. The method of claim 1 further comprising applying the mixture to soil by slurry spraying.

6. The method of claim 1 where the mixture comprises about 0.1 to about 1.0 percent by weight calcium cyanamide.

7. The method of claim 1 further comprising adding at least one additional nitrogen-containing material to the mixture.

8. The method of claim 7 where the at least one additional nitrogen-containing material is an ammonium salt.

9. The method of claim 8 where the ammonium salt is selected from the group consisting of ammonium sulfate, ammonium chloride, ammonium monophosphate, ammonium diphosphate, ammonium citrate, ammonium nitrate, calcium ammonium phosphate, and mixtures thereof.

10. The method of claim 1 further comprising adding at least one non-nitrogen material to the mixture.

11. The method of claim 10 where the non-nitrogen material is a plant nutrient.

12. The method of claim 10 where the non-nitrogen material is selected from the group consisting of phosphorous, potassium, iron, copper, zinc, manganese, boron, magnesium, molybdenum, sulfur, and mixtures thereof.

13. The method of claim 1 where the mixture further comprises a nitrogen-containing compound selected from the group consisting of ammonium sulfate, ammonium chloride, ammonium monophosphate, ammonium diphosphate, ammonium citrate, ammonium nitrate, calcium ammonium phosphate, and mixtures thereof and a non-nitrogen plant nutrient selected from the group consisting of phosphorous, potassium, iron, copper, zinc, manganese, boron, magnesium, molybdenum, sulfur, and mixtures thereof.

14. The method of claim 1 further comprising dehydrating the mixture to form a solid.

15. The method of claim 1 further comprising inhibiting aeration by forming the mixture in the presence of a gas that serves to substantially exclude the atmosphere.

16. The method of claim 15 where the gas is selected from the group consisting of nitrogen, acetylene, ammonia, argon, and mixtures thereof.

17. The method of claim 16 where the gas is acetylene and the acetylene is generated from residual calcium carbide in the calcium cyanamide.

18. The method of claim 14 where the mixture further comprises at least one additional nitrogen-containing compound.

19. The method of claim 14 where the mixture further comprises at least one additional non-nitrogen material.

20. The method of claim 19 where the non-nitrogen material is a plant nutrient.

21. The method of claim 1 where the mixture further comprises a hardening agent.

22. The method of claim 1 where the mixture comprises from about 0.01 to about 5.0 percent calcium cyanamide and from about 95 to about 99.99 percent manure.

23. The method of claim 1 where the mixture comprises from about 0.01 to about 1.0 percent calcium cyanamide and from about 99 to about 99.99 percent manure.

24. A method of enhancing plant growth, comprising adding about 0.01 to about 5.0 percent calcium cyanamide by weight calcium cyanamide to about from about 95 to about 99.99 percent manure to form a mixture, where the manure comprise water in an amount at least 14× the mass of the calcium cyanamide; inhibiting aeration of the mixture by forming the mixture in a closed container; and applying the mixture to enhance plant growth.

25. The method of claim 24, wherein the manure consist of dairy effluent.

26. A method of enhancing plant growth, comprising;
combining greater than about 40 parts of water with about 10 parts of a combination of calcium cyanamide and urea, where the about 10 parts of a combination of calcium cyanamide and urea further comprises from about 0.1 to about 3 parts calcium cyanamide and from about 7 to about 9.9 parts urea to form a first aqueous composition;

inhibiting aeration of the first aqueous composition;

adding the first aqueous composition to additional water to form a second aqueous composition; and applying the second aqueous composition to enhance plant growth.

\* \* \* \* \*